United States Patent [19]
Tsukamoto et al.

[11] Patent Number: 5,886,795
[45] Date of Patent: *Mar. 23, 1999

[54] PORTABLE FACSIMILE APPARATUS INTO WHICH A DOCUMENT OR A RECORDING SHEET IS MANUALLY SET

[75] Inventors: Takeshi Tsukamoto, Kawasaki; Toshio Kenmochi, Yokohama; Yosuke Ezumi, Yokohama; Hisashi Toyoda, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 547,832

[22] Filed: Oct. 25, 1995

Related U.S. Application Data

[63] Continuation of Ser. No. 150,372, Nov. 10, 1993, abandoned.

[30] Foreign Application Priority Data

| Nov. 12, 1992 | [JP] | Japan | 4-302546 |
| Nov. 12, 1992 | [JP] | Japan | 4-302548 |

[51] Int. Cl.$^6$ ...................................................... H04N 1/32
[52] U.S. Cl. ........................... 358/437; 358/434; 358/439
[58] Field of Search .................................... 358/400, 405, 358/434, 435, 436, 437, 438, 439, 442, 468, 404, 444; 379/100, 100.06; H04N 1/04, 1/32

[56] References Cited

U.S. PATENT DOCUMENTS

| 4,970,599 | 11/1990 | Nobuta | 358/296 |
| 5,018,022 | 5/1991 | Tatsumi | 358/441 |
| 5,216,472 | 6/1993 | Muto et al. | 355/313 |
| 5,243,437 | 9/1993 | Millman et al. | 358/400 |
| 5,295,182 | 3/1994 | Fujii | 358/441 |
| 5,296,907 | 3/1994 | Kawabuchi et al. | 355/313 |
| 5,418,630 | 5/1995 | Mori et al. | 358/472 |
| 5,455,687 | 10/1995 | Fukui et al. | 358/436 |

FOREIGN PATENT DOCUMENTS

| 0289005 | 11/1988 | European Pat. Off. . |
| 63-142958 | 6/1988 | Japan . |
| 63-193662 | 8/1988 | Japan . |
| 63-262954 | 10/1988 | Japan . |
| 4235452 | 8/1992 | Japan . |
| 4301940 | 10/1992 | Japan . |
| 2166619 | 5/1986 | United Kingdom . |

OTHER PUBLICATIONS

Patent Abstracts of Japan, vol. 12, No. 403 (E–674), Oct. 26, 1988.
Patent Abstracts of Japan, vol. 17, No. 125 (E–1332), Mar. 16, 1993.
Patent Abstracts of Japan, vol. 13, No. 86 (E–720), Feb. 28, 1989.

*Primary Examiner*—Kim Yen Vu
*Attorney, Agent, or Firm*—Fitzpatrick Cella Harper & Scinto

[57] ABSTRACT

In a portable facsimile apparatus according to this invention, each recording paper (or each document to be transmitted) may be set in place by manual operation. In a case where the portable facsimile apparatus needs additional recording paper (or an additional document) to be set by an operator during image reception or image transmission, the portable facsimile apparatus so informs the operator, while the apparatus delays shifting following image reception or image transmission. As a result, the operator can set additional recording paper (or an additional document) into the portable facsimile apparatus, during image reception, without terminating the image reception.

66 Claims, 41 Drawing Sheets

FIG.1
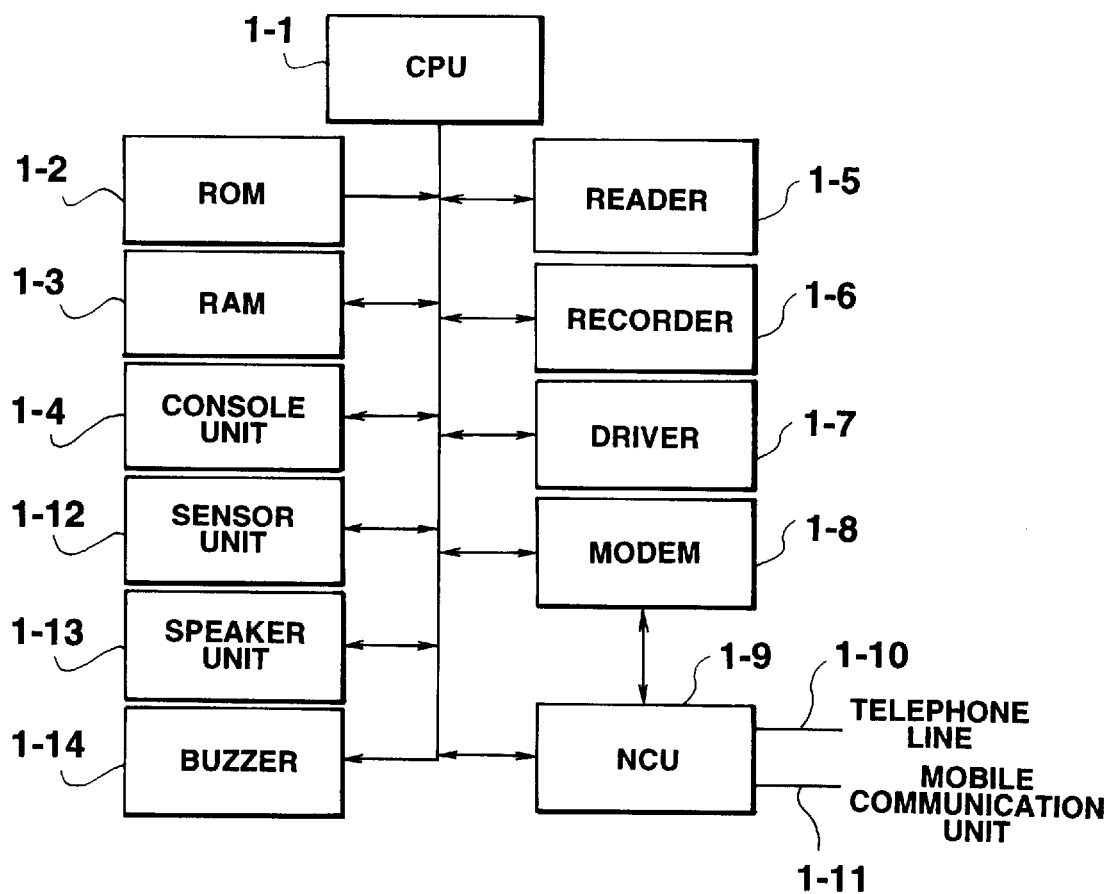
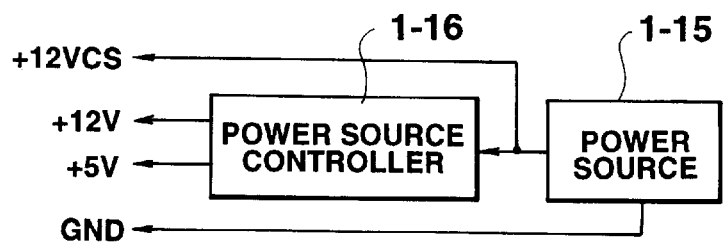

FIG.5
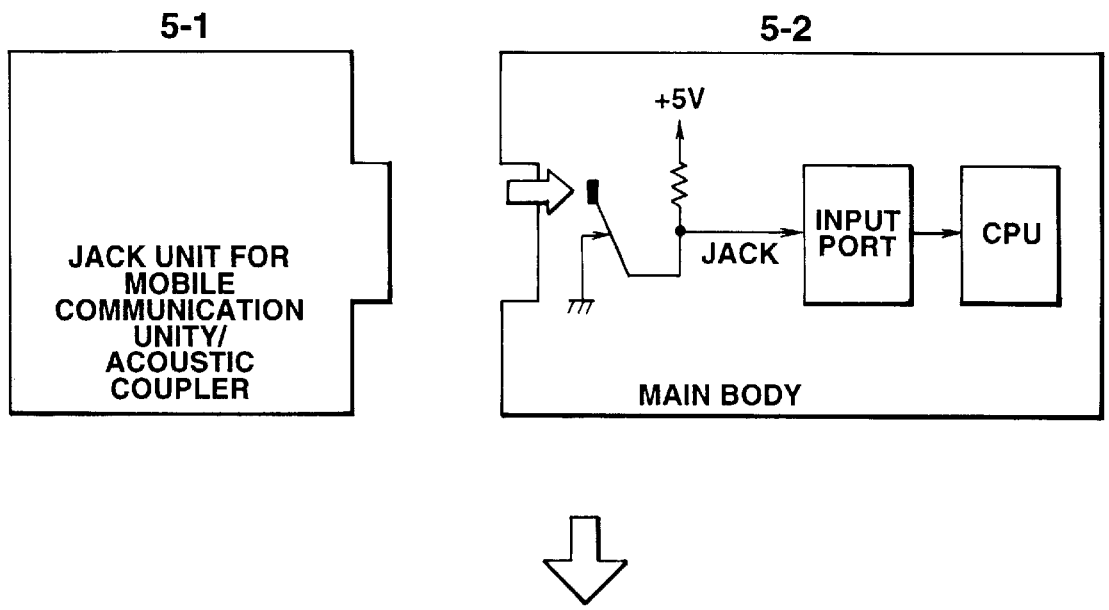
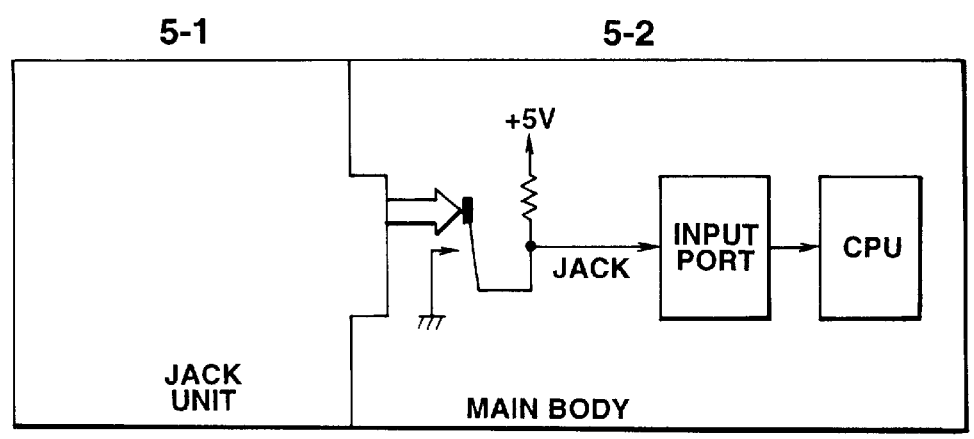

PORTABLE FACSIMILE APPARATUS INTO WHICH A DOCUMENT OR A RECORDING SHEET IS MANUALLY SET

This application is a continuation of application Ser. No. 08/150,372 filed Nov. 10, 1993, which is now abandoned.

BACKGROUND OF THE INVENTION

1. Field of the Invention

The present invention relates to a portable facsimile apparatus into which a document or a recording sheet is manually set.

2. Related Background Art

Conventional portable facsimile apparatuses have one of two arrangements—one includes all functions of a facsimile apparatus, while the other has only minimum functions, such as transmission and reception. Along with the development of an information-oriented society, facsimile apparatuses are often used in places other than where originally installed. Accordingly, demand has arisen for development of a portable facsimile apparatus which is not limited to use at its original place of installation.

The assignee of the present invention has previously filed an application relating to a portable facsimile system which includes a portable facsimile unit having only the minimum functions described above (Ser. No. 07/952,946, filed Sep. 28, 1992). The portable facsimile unit described in that co-pending application, however, does not provide an automatic document supply or an automatic recording paper supply.

In the case where that facsimile unit transmits plural pages of documents or receives plural pages of image data, each of the pages must be manually set in turn by an operator during image transmission or image reception, so as to prevent an image communication error.

SUMMARY OF THE INVENTION

In consideration of the foregoing, one object of the present invention is to provide an improvement over conventional types of portable facsimile apparatuses.

Another object of the present invention is to provide a portable facsimile apparatus which can easily be carried by an operator, and which is capable of continuously performing image communication of plural pages without a communication error.

Another object of the present invention is to provide a portable facsimile apparatus into which an operator can set plural pages of documents during image transmission without the ongoing image transmission being terminated.

Another object of the present invention is to provide a portable facsimile apparatus into which an operator can set recording sheets during image reception without terminating the image reception. These and other objects are accomplished by providing a portable facsimile apparatus, into which a document or a recording material is manually set, having means for advising that additional documents or additional material is being set, and means for performing the process of holding a communication link during the advising operation.

Still other objects of the present invention, and the advantages thereof, will become fully apparent from the following description of the preferred embodiment to be taken in conjunction with the attached drawings.

BRIEF DESCRIPTION OF THE DRAWINGS

FIG. 1 is a block diagram showing the arrangement of a main body of a portable facsimile apparatus according to one embodiment of the present invention.

FIG. 5 is a view showing a condition of the signal JACK.

DETAILED DESCRIPTION OF THE PREFERRED EMBODIMENT

Figure 2A:
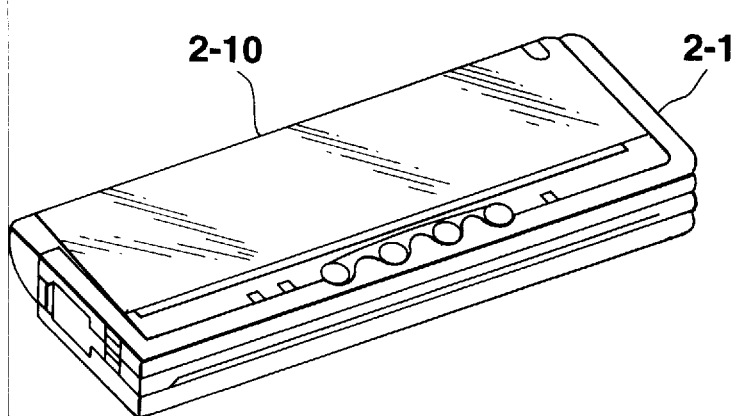
FIGS. 2(a) and 2(b) are perspective views of the portable facsimile apparatus.

An embodiment according to the present invention will be described in detail with reference to the accompanying drawings.

FIG. 1 is a block diagram showing the arrangement of a main body according to this embodiment.

Referring to FIG. 1, a CPU 1-1 controls the overall operation of the portable facsimile apparatus according to programs stored in ROM 1-2, i.e., the function of controlling RAM 1-3, console unit 1-4, reader 1-5, recorder 1-6, driver 1-7, modem 1-8, NCU 1-9, telephone line 1-10, mobile communication unit 1-11, sensor unit 1-12, speaker unit 1-13, buzzer 1-14, power source 115, and power source controller 1-16.

RAM 1-3 stores binary image data read by reader 1-5, binary image data to be recorded by the recorder 1-6, and binary data to be modulated by modem 1-8 and transmitted through NCU 1-9 to telephone line 1-10. A signal received through the telephone line 1-10 is demodulated by modem 1-8 through NCU 1-9, and the demodulated binary data is stored in RAM 1-3.

Console unit 1-4 includes a transmission/reception start key, a mode key for designating an image quality mode, such as fine or standard, of the image to be transmitted, a copy key for performing a copying operation, an economy key for designating an energy-saving mode in recording/printing by use of a battery, and a stop key for stopping the operation of the main body. The CPU 1-1 detects the states of each of the console unit keys and controls the respective components in accordance with the states of each of the keys.

Reader 1-5 includes a DMA controller, a CCD or contact image sensor (CS), a TTLIC, a binarizing circuit, etc. The reader 1-5 causes the CCD or CS to convert the read data into binary data, under the control of CPU 1-1 and sequentially sends the binary data to RAM 1-3.

Recorder 1-6 includes a DMA controller, a B4/A4 size thermal head, a TTLIC, etc. The reader 1-6 reads out the recorded data from RAM 1-3 under the control of CPU 1-1 and prints out the recorded data as a hard copy.

Driver 1-7 includes a stepping motor for driving feed/discharge rollers in reader 1-5 and recorder 1-6, gears for transmitting the driving force of the motor, a driver circuit for controlling the motor, etc.

Modem 1-8 includes any suitable modem, such as G3, G2, G1 and old FM modems, a clock generator connected to the modems, etc. The modem 1-8 modulates the transmission data stored in RAM 1-3 under the control of CPU 1-1 and outputs the modulated data to telephone line 1-10 or mobile communication unit 1-11 through NCU 1-9. In addition, modem 1-8 receives an analog signal from telephone line 1-10 or mobile communication unit 1-11 through NCU 1-9, demodulates the analog signal, and stores it in RAM 1-3. The modem 1-8 has a power-saving mode, which saves on the consumption of electric power and is operated by the CPU 1-1. In the power-saving mode, the electric power consumption can be decreased to 1/10 of the normal consumption. However, when the power-saving mode is utilized, the facsimile apparatus can not perform image transmission or image reception.

NCU 1-9 comprises a DC loop circuit, a 2-to-4 wire converter, a receiving circuit, a signal detecting circuit, a line switching circuit, etc. The NCU 1-9 connects telephone line 1-10 or mobile communication unit 1-11 to modem 1-8.

The mobile communication unit 1-11 is defined as a radio communication unit, such as a portable telephone or a mobile telephone, and the mobile communication line is defined as a line used for the portable telephone and the mobile telephone.

Sensor unit 1-12 includes a recording paper width sensor, a recording paper presence sensor, a recording paper end-mark sensor, an original sheet width sensor, and an original sheet presence sensor. The sensor unit 1-12 detects the states of the original sheet and the recording paper under the control of CPU 1-1.

Speaker unit 1-13 includes a speaker and a speaker driver, and is turned on/off in accordance with the control of CPU 1-1. The speaker unit 1-13 outputs sounds of plural kinds of signals which are received through telephone line 1-10, and outputs sounds of key-touch, voice signals, and communication signals from the mobile communication unit 1-11.

Buzzer 1-14 includes a buzzer and a buzzer driver and generates a warning tone in accordance with the control of CPU 1-1.

Figure 3A:
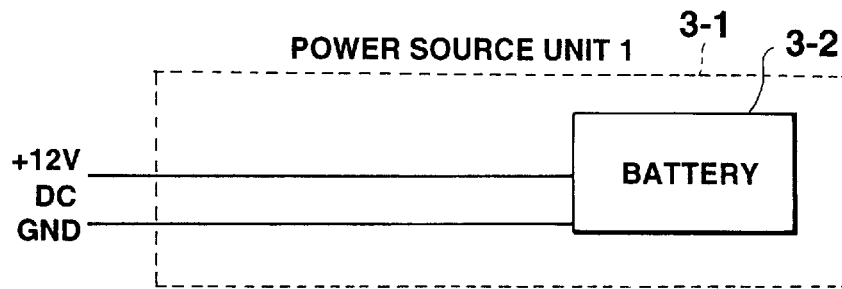
FIGS. 3(a) to 3(c) are block diagrams showing the arrangements of a power source of the main body.
Figure 3B:
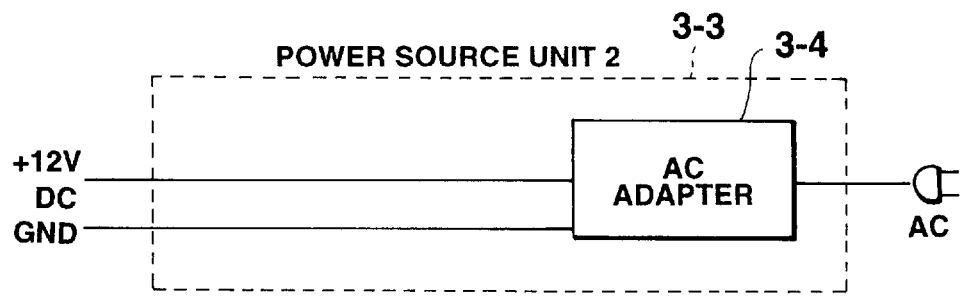

Power source 1-15 supplies power to the main body of the facsimile apparatus. The power source 1-15 supplies a DC voltage of +12V and a GND by means of a battery, an AC power source, or a car battery (as shown in FIGS. 3($a$)–3($c$)).

Power source controller 1-16 includes a series regulator, a switching-regulator, a DC/DC convertor, a photovoltaic cell, and a MOSFET. The power source controller 1-16 converts the DC voltage of +12V from power source 1-15 into a DC voltage of +5V, and outputs the voltage of +5V. The power source controller 1-16 is controlled by CPU 1-1. In an output sequence of the power source 1-15 and the power source controller 1-16, the DC voltage of +12VCS is generated, then the DC voltage of +5V is generated, and then the DC voltage of +12V is generated. The voltage of +12V can be turned on/off in accordance with the control of CPU 1-1.

Figure 2B:
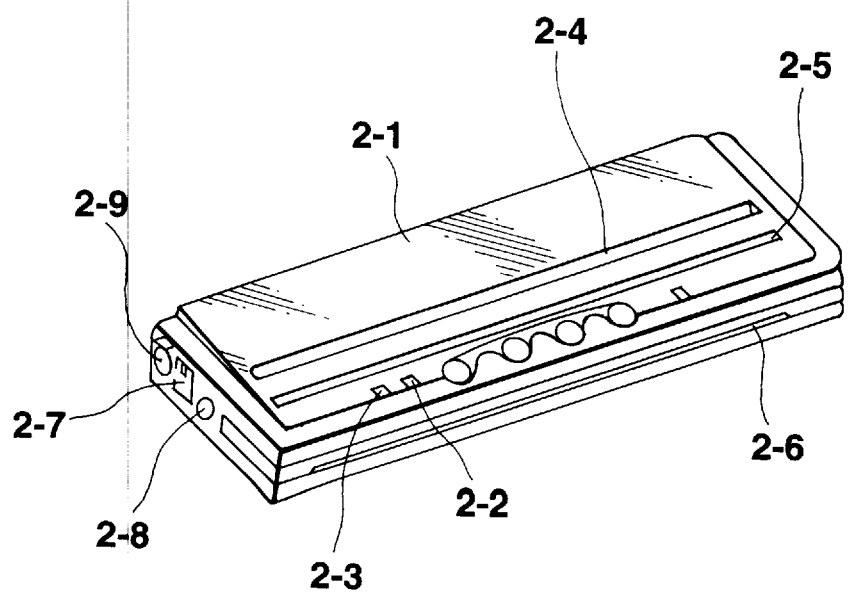

FIGS. 2($a$) and 2($b$) are outline views of the facsimile apparatus. Numeral 2-1 denotes the main body of the facsimile apparatus. Numeral 2-2 denotes the console unit, and Numeral 2-3 denotes a display unit. Numeral 2-4 denotes a recording paper inserting unit which enables manual setting of recording paper, and numeral 2-5 denotes an original sheet inserting unit which enables manual setting of an original sheet. The original sheet inserting unit 2-5 is also used as a recorded paper discharging unit for discharging the recorded paper.

Numeral 2-6 denotes an original sheet discharging unit for discharging read original sheets. Numeral 2-7 denotes a connector for connecting the main body of the facsimile apparatus to telephone line 1-10, and numeral 2-8 denotes a connector for connecting the main body to the mobile communication unit 1-11.

Numeral 2-9 denotes a power switch for supplying the power to the main body. Numeral 2-10 denotes a holder which holds a roll of paper. FIG. 2($a$) shows a condition wherein the holder 2-10 is attached to main body 2-1.

FIGS. 3($a$) to 3($c$) are block diagrams showing the structure of power source 1-15. In FIG. 3($a$), power source 1-15 consists of a battery 3-2 of a DC voltage of +12V.

Figure 3C:
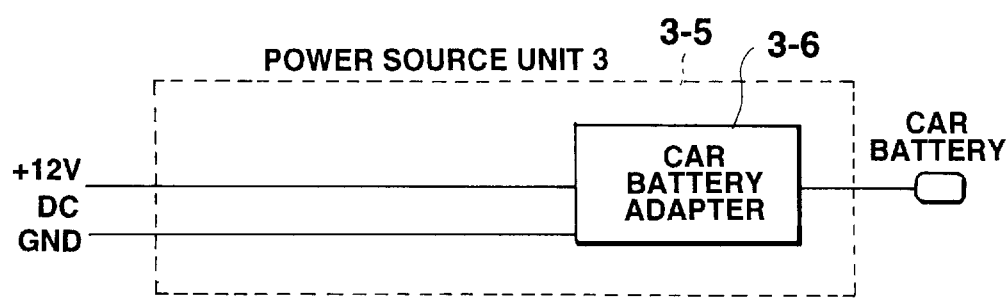

In FIG. 3($b$), power source 1-15 consists of an AC adapter 3-4 which converts the AC power source into a DC voltage of +12V. In FIG. 3(c), power source 1-15 consists of a car battery adapter 3-6 which converts a DC power from the car battery into a stabilized DC voltage of +12V.

Figure 4:
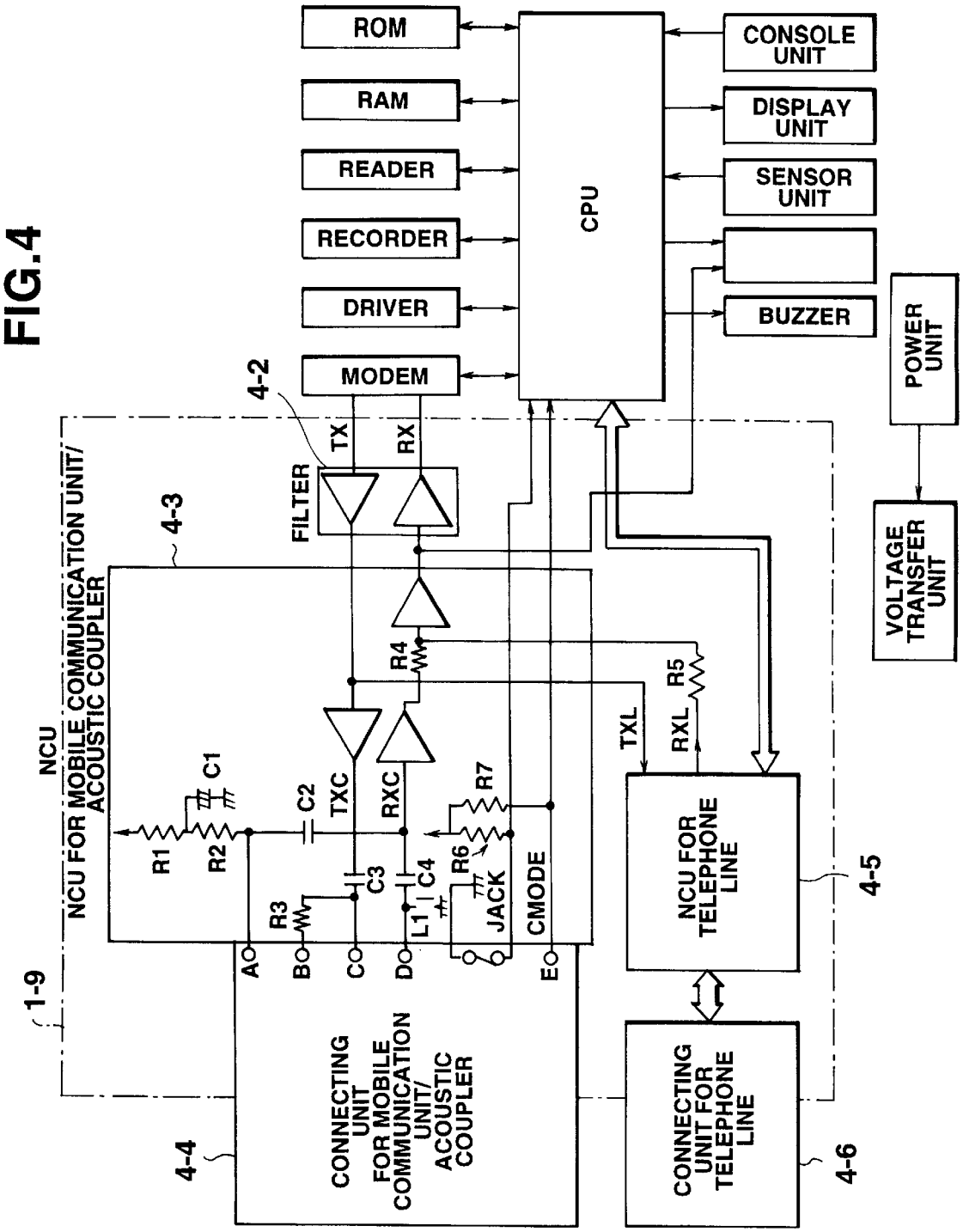
FIG. 4 is a detailed block diagram showing the arrangement of NCU 1-9.

FIG. 4 is a block diagram showing a detailed structure of the NCU 1-9. The NCU 1-9 consists of a filter unit 4-2, an NCU 4-3 for a mobile telephone/acoustic coupler, a connector unit 4-4 for a mobile telephone/acoustic coupler, an NCU 4-5 for a telephone line, and a connector unit 4-6 for a telephone line.

Filter unit 4-2 is a low-pass filter which includes OP amplifiers and other components. The NCU 4-3 for a mobile telephone/acoustic coupler is composed of OP amplifiers, resistors, condensers, inductors, etc. A signal to be transmitted is amplified by filter unit 42, is adjusted to a signal level corresponding to mobile communication unit 1-11 or to the acoustic coupler by the NCU 4-3, and then is output as a transmission signal TXC. A receiving signal from the mobile communication unit 1-11 is amplified by an OP amplifier of the NCU 4-3 through inductors and condensers, and is then sent to the filter unit 4-2 through an adder circuit. The signal from the condenser microphone of the acoustic coupler is amplified by an OP amplifier through condensers, and is then supplied to filter unit 4-2 through the adder circuit. The NCU 4-3 includes power source which supplies a power to the condenser microphone of the acoustic coupler. The NCU 4-3 supplies both the receiving signal RXC from the mobile communication unit/acoustic coupler, and the receiving signal RXC from the telephone line, to the filter unit 4-2 through the adder circuit. The structure of NCU 4-3 may be modified so as to supply power selectively by using an analog switch, a relay, etc.

Connector unit 4-4 is a connector having a switch, and serves as an interface for the mobile communication unit and the acoustic coupler. Terminal C supplies a transmitting signal TX from the modem 1-8 to the mobile communication unit 1-11. Terminal D supplies the receiving signal from the mobile communication unit 1-11 to the modem 1-8. Terminal A supplies the transmitting signal from the modem 1-8 to the acoustic coupler. Terminal B supplies the receiving signal from the acoustic coupler to the modem 1-8.

A signal JACK indicates whether a plug of the mobile communication unit 1-11 or the acoustic coupler is connected into the connector unit 4-4. The signal JACK is applied to CPU 1-1. FIG. 5 is a view showing a condition of the signal JACK. When the plug 5-1 of the mobile communication unit 1-11, or the acoustic coupler, is connected into the connector unit 4-4 of the main body 5-2, a switch in the connector unit 4-4 is turned off by the plug and the signal JACK is then switched from a LOW level to a HIGH level.

Figure 6:
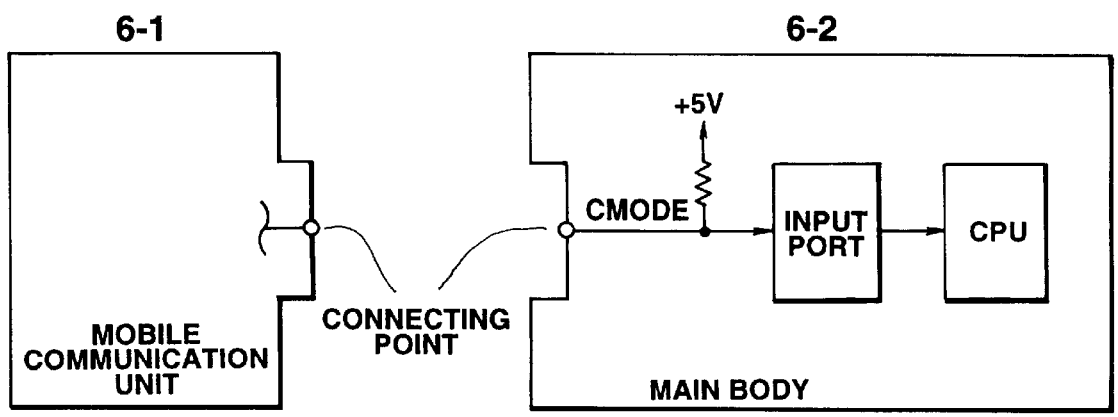
FIG. 6 and FIG. 7 are views showing a condition of the signal CMODE.
Figure 7:
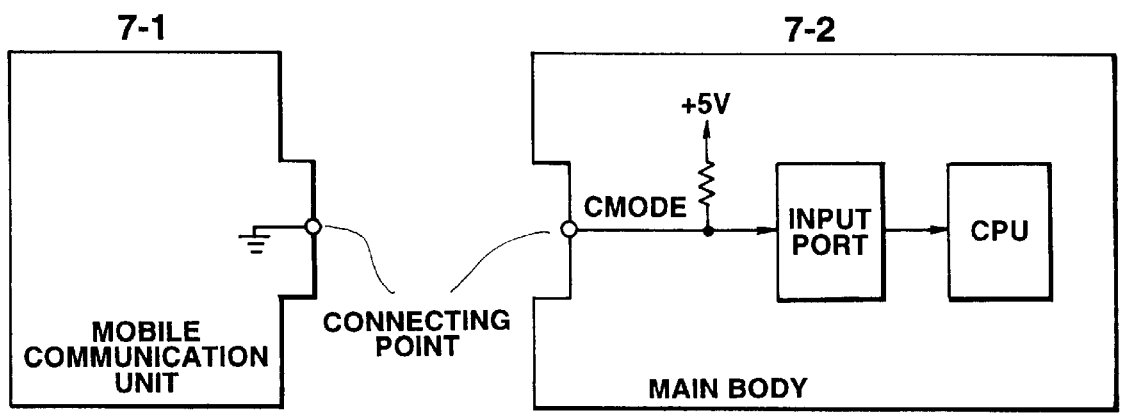

A signal CMODE (see FIG. 4) indicates whether the mobile communication unit 1-11 or the acoustic coupler is connected to the connector unit 4-4. In the case where the mobile communication unit 1-11 is connected to the connector unit 4-4 of the main body 6-2, the signal CMODE is at a HIGH level as shown in FIG. 6. On the other hand, when the acoustic coupler is connected into the connector unit 4-4 of the main body 7-2, the signal CMODE is at a LOW level as shown in FIG. 7.

The connector unit 4-4 includes a GND for the signal JACK.

By using the above-described signals, the portable facsimile apparatus checks whether any plug (the mobile communication unit or the acoustic coupler) is inserted into the connector unit 4-4 or not. The CPU then changes the level of a transmitted signal and the speed of the signal in accordance with the signal JACK.

In a case where the plug of the mobile communication unit or the acoustic coupler is inserted into the connector unit 4-4, CPU 1-1 sets a communication speed of 4800 bps. On the other hand, in a case where the telephone line is connected to the connector unit 4-6, CPU 1-1 sets the communication speed to 9600 bps (bits per second). The portable facsimile apparatus selects either the receiving signal from the connector unit 4-4 or the receiving signal from the connector unit 4-6, and switches the level of monitoring communication signals in accordance with the signal JACK.

Further, in accordance with the signal CMODE, the CPU 1-1 discriminates whether the mobile communication unit or the acoustic coupler is connected to the connector unit 4-4, and then sets the transmitting level and the receiving level at adequate values corresponding to the mobile communication unit and the acoustic coupler.

The NCU 4-5 for the telephone line includes the DC loop circuit and the 2 to 4 wire converter and seizes the telephone line in accordance with the control of the CPU 1-1.

The connector unit 4-6 is a jack unit for connecting a telephone line to this facsimile apparatus.

Figure 8:
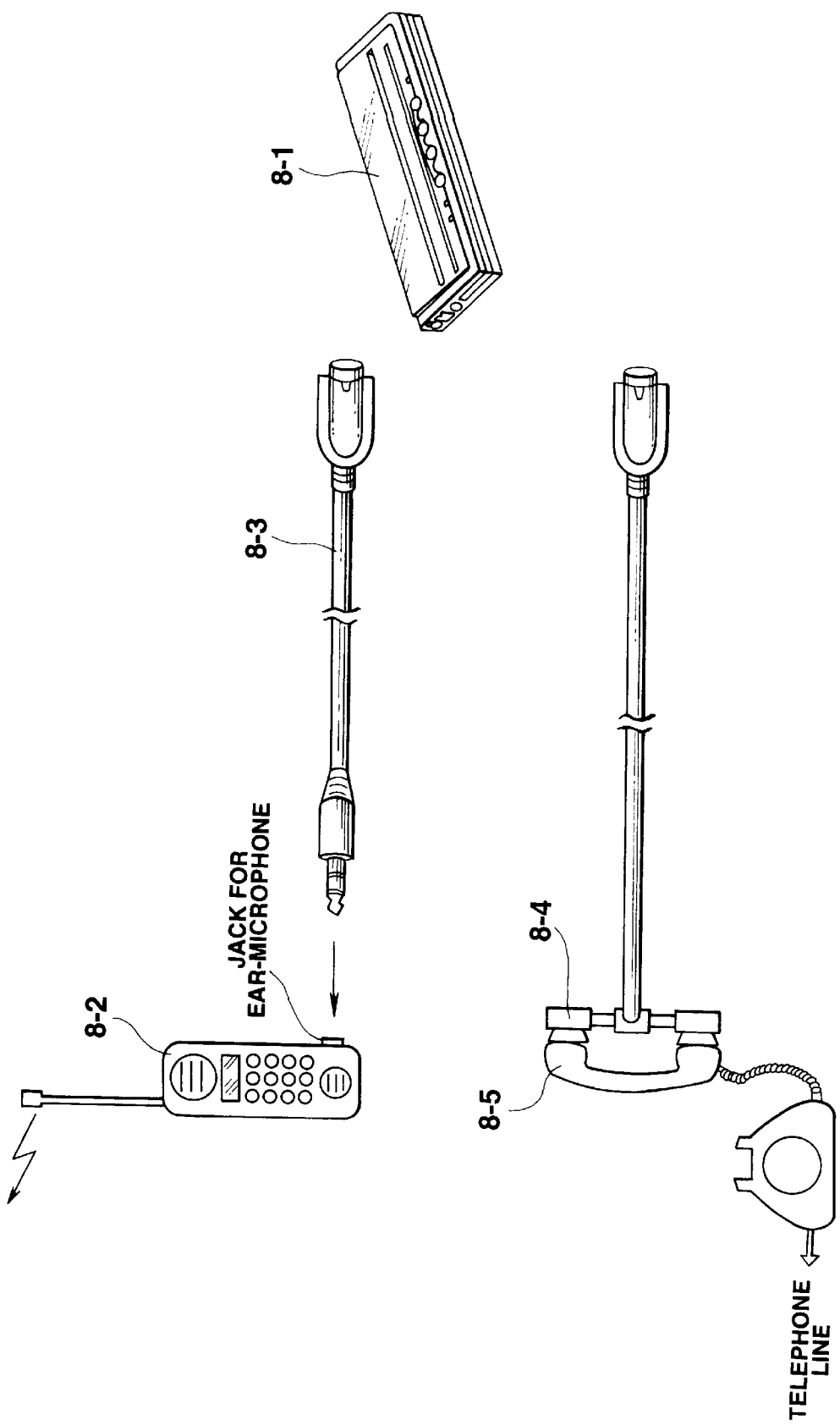
FIG. 8 is a view showing a connection condition between the main body and communication links.

FIG. 8 is a view showing a condition in which the main body 8-1 of the portable facsimile apparatus is connected to the mobile communication unit 8-2 through a cable 8-3. As shown in FIG. 6, when the mobile communication unit is connected to the main body, the signal CMODE goes to the HIGH level.

FIG. 8 also shows a condition in which the main body 8-1 is connected to the acoustic coupler 8-4 and a telephone 8-5. As shown in FIG. 7, when the acoustic coupler 8-4 is connected to the main body, the signal CMODE goes to the LOW level.

Figure 9:
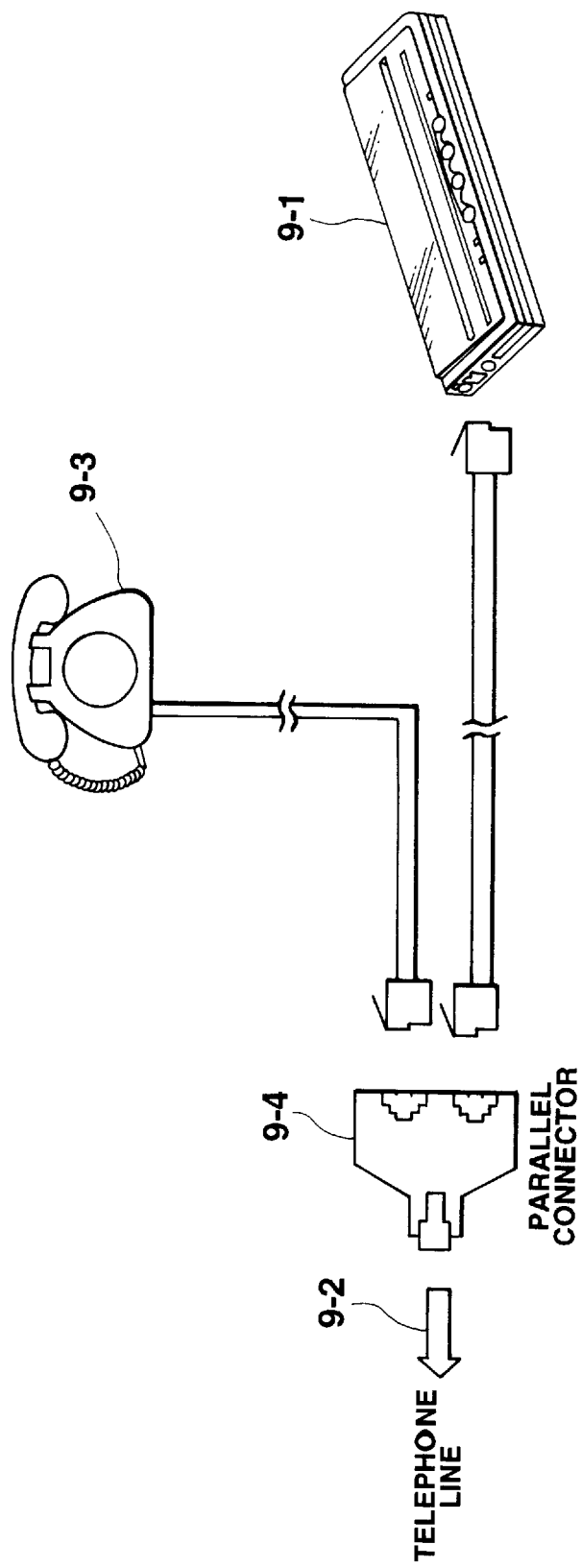
FIG. 9 is a view showing a connecting condition of the main body, a telephone and a communication line through a parallel connector.

FIG. 9 shows a condition in which the main body of the portable facsimile apparatus is connected to the telephone line 9-2 and a telephone 9-3 through a parallel connector 9-4.

The operation of the portable facsimile apparatus will now be described as follows. The control programs which are performed by CPU 1-1 have been stored in ROM 1-2.

Figure 10:
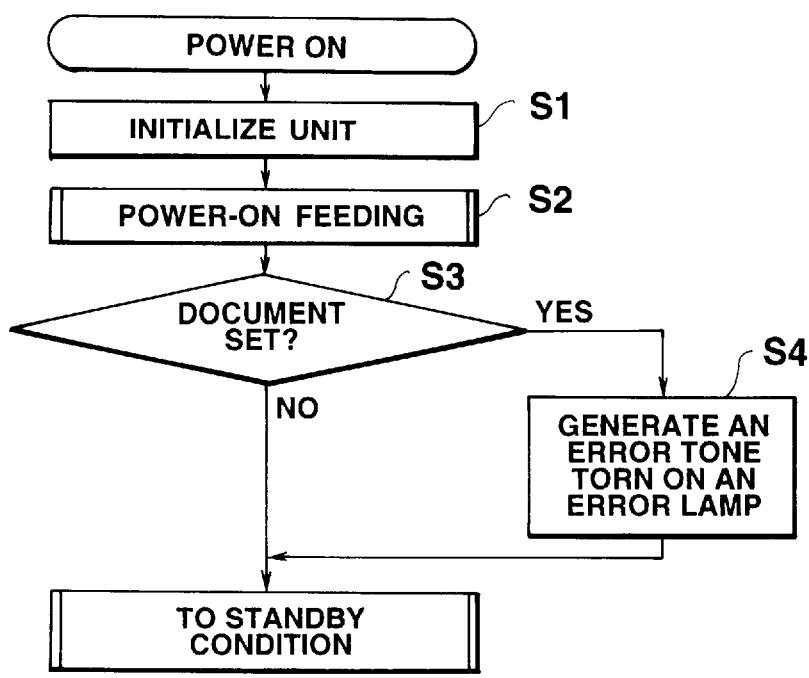
FIG. 10 is a flow chart showing a power-on operation.

When power is supplied to the portable facsimile apparatus, in step S1 of FIG. 10 CPU 1-1 initializes each unit described above in the system of the portable facsimile apparatus. In step S2, CPU 1-1 performs a feeding operation when power is turned on. In the feeding operation, CPU 1-1 switches a pendulum, which is in a switching unit of a driver, from a recording sheet side to an original sheet side, by means of rotating a motor in the driver. The portable facsimile apparatus uses the driving power of the motor to transfer either an original document or a recording sheet by switching the pendulum setting. The feeding operation will be described in detail below. In step S3, CPU 1-1 discriminates whether an original document is set in reader 1-5 when the power is turned on. In a case where an original document is present, in step S4 CPU 1-1 turns on an error lamp and generates an alarm to inform an operator of it and then shifts to a standby mode, shown in FIG. 11.

Figure 11:
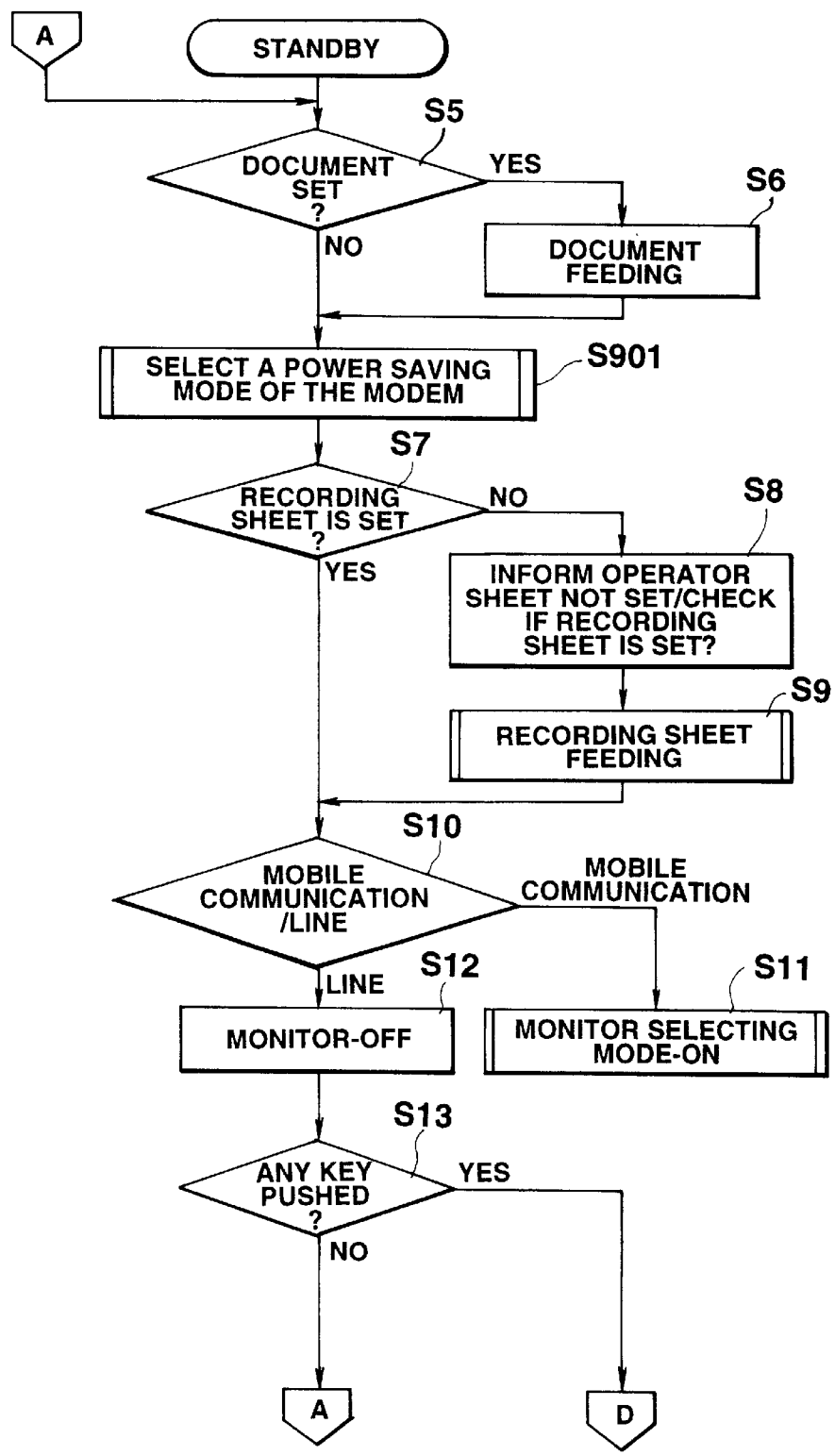
FIG. 11 and 12 together form a flow chart showing a standby operation.

In step S5 of FIG. 11, the CPU 1-1 discriminates whether an original document has been set in reader 15. In the case where an original document is present, CPU 1-1 feeds the original document to a reading position in the reader 1-5 in step S6. In step S901, CPU 1-1 sets the modem 1-8 into the power-saving mode. In step S7, the CPU 1-1 discriminates whether a recording sheet has been set in the recorder 1-6. In a case where no recording sheet has been set, CPU 1-1 performs an operation of indicating that no recording sheet has been set, and again checks whether a recording sheet is set in step S8. If a recording sheet has been set, in step S9 the CPU 1-1 performs the operation of feeding the recording sheet. Then, in step S10, the CPU 1-1 discriminates whether a line connected to the main body is the mobile communication unit 1-11 or the telephone line 1-10. In a case where the connected line is the mobile communication unit 111, in step S11 the CPU 1-1 performs an operation (FIG. 18) of setting a monitor mode which outputs a communication signal from the speaker unit 1-13. On the other hand, in a case where the connected line is the telephone line 1-10, in step S12 the CPU 1-1 sets the monitor mode to off.

Figure 12:
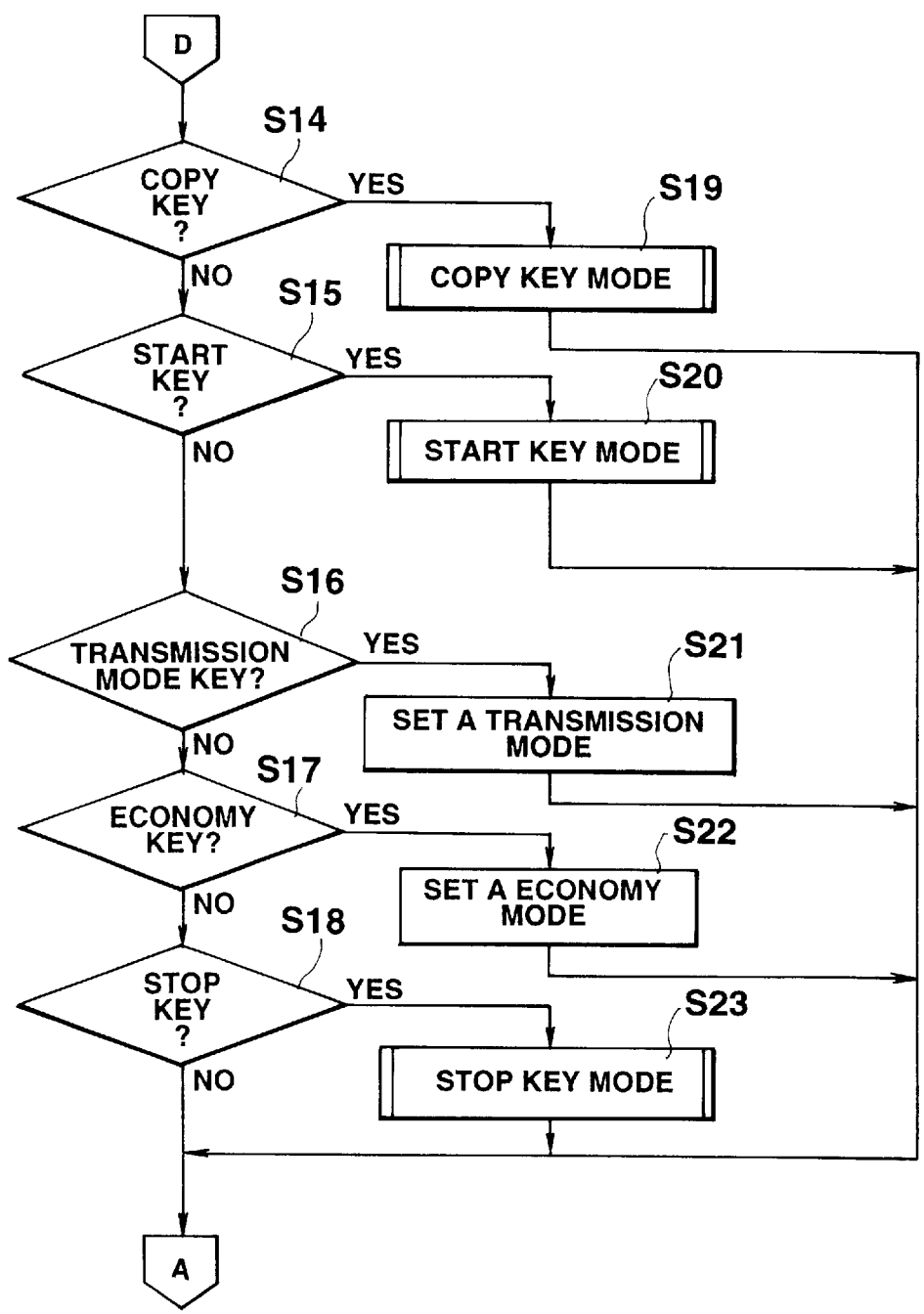

In step S13, the CPU 1-1 discriminates whether any key has been pushed. If any key is pushed, the CPU 1-1 shifts from step S13 to step S14 (FIG. 12). On the other hand, if no key has been pushed, the CPU 1-1 returns to step S5.

The CPU 1-1 discriminates whether the pushed key is the copy key (step S14), a transmission mode key (step S15), an economy key (step S17), or a stop key (step S18). If the pushed key is the copy key, the CPU 1-1 performs an operation of a copy key mode (FIG. 13) in step S19. If the pushed key is the start key, the CPU 1-1 performs an operation of a start key mode (FIG. 14) in step S20. If the pushed key is the transmission key, the CPU 1-1 sets a line density of reading a document (standard mode: 3.85 lines/mm, or fine mode: 7.7 lines/mm) in step S21. If the pushed key is the economy key, the CPU 1-1 sets an economy mode, which prints image data intermittently so as to save printing energy, in step S22. If the pushed key is the stop key, the CPU 1-1 performs an operation of a stop key mode (FIG. 17) in step S23. The CPU 1-1 then returns to the standby condition of FIG. 11.

Figure 13:
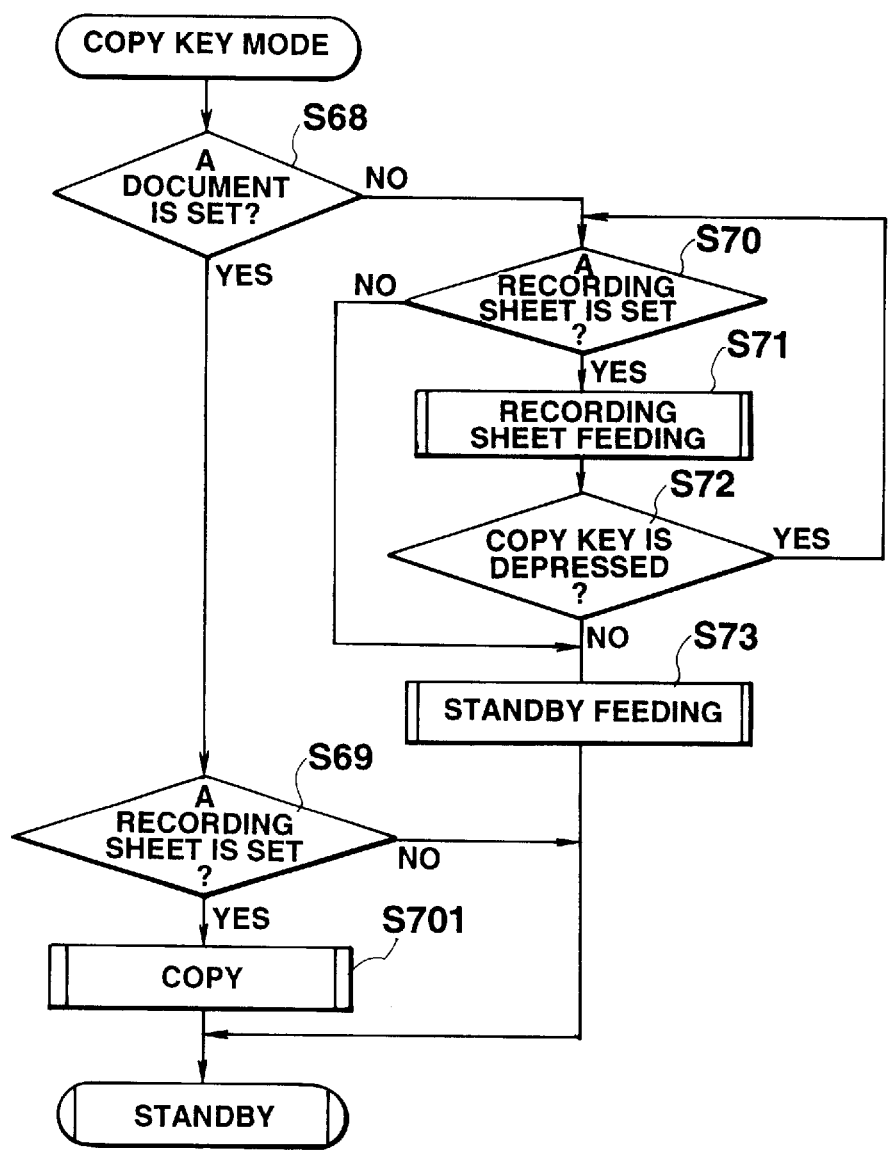
FIG. 13 is a flow chart showing an operation of a copy key mode.

FIG. 13 is a flow chart showing the operation of the copy key mode of step S19 (FIG. 12).

In step S68, the CPU 1-1 discriminates whether an original document has been set. In a case where an original document has been set, the CPU 1-1 discriminates whether a recording sheet is in the recorder 1-6 in step S70. If a recording sheet is present, the CPU 1-1 performs a feed operation of the recording sheet (FIG. 20) so as to feed the recording sheet a fixed amount in step S71, and then discriminates whether the copy key is still activated in step S72. In a case where the copy key is still depressed, the CPU 1-1 returns to step S70 and continues to perform the feed operation on the recording sheet. If a recording sheet is not in the recorder 1-6 in step S70, or if the copy key is not yet depressed in step S72, the CPU 1-1 performs a standby feed operation (FIG. 19) in step S73, and then returns to the standby condition of step S5 (FIG. 11) In the standby feed operation, the CPU 1-1 puts the driver 1-7 back in the initial position. On the other hand, in a case where an original document is in the reader 1-5 in step S68, the CPU 1-1 discriminates whether a recording sheet has been set in step S69. If not, the CPU 1-1 shifts to the standby condition of step S5 (FIG. 11). On the other hand, if a recording sheet has been set in step S69, the CPU 1-1 performs a copying operation (FIG. 22) in step S701, and then shifts to the standby condition of step S5.

Figure 14:
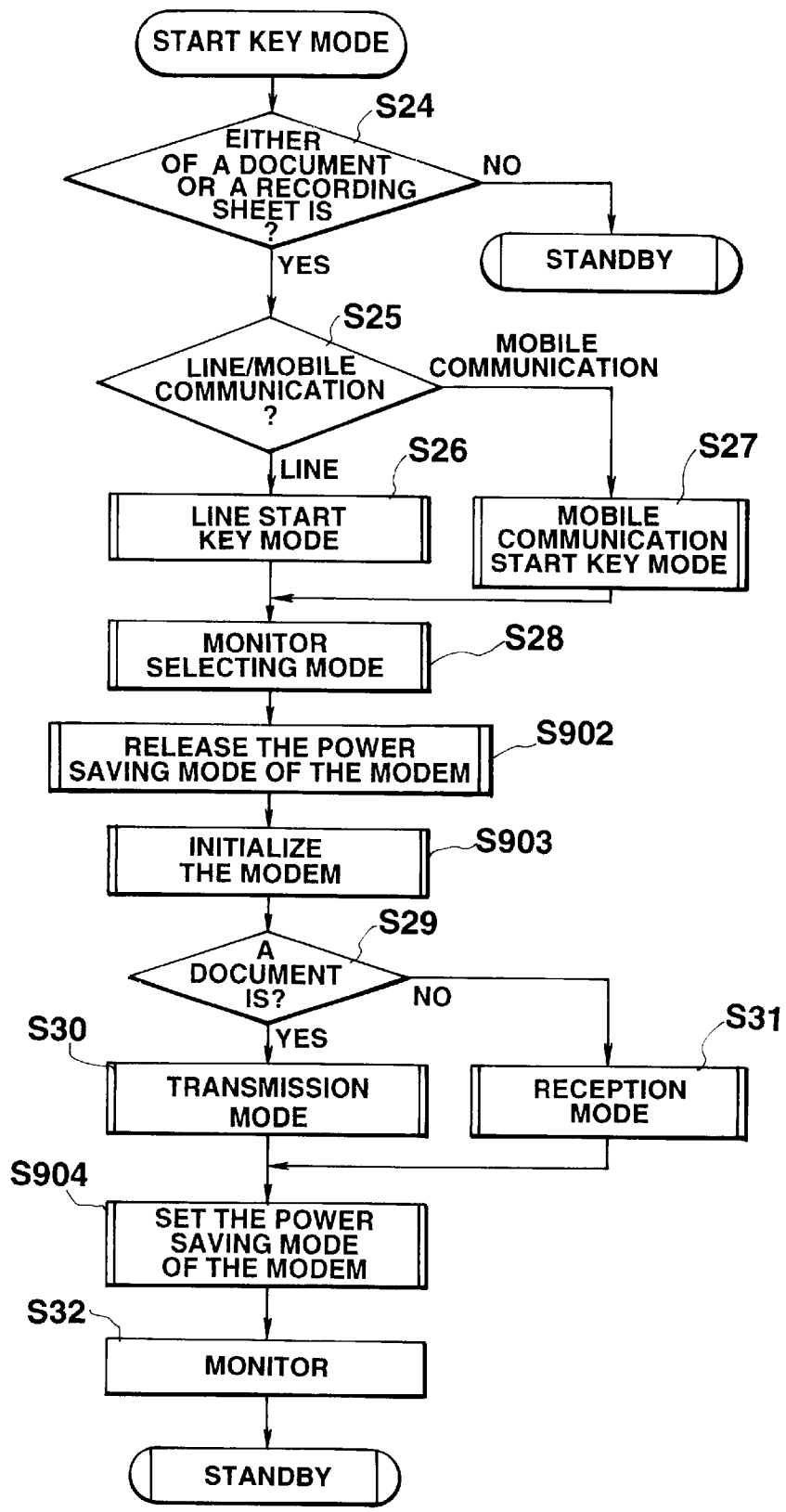
FIG. 14 is a flow chart showing an operation of a start key mode.

FIG. 14 is a flow chart showing an operation of the start key mode of step S20 (FIG. 12).

In step S24 of FIG. 14, the CPU 1-1 checks whether an original document and a recording sheet have been set. If they have not been set, the CPU 1-1 returns to the standby condition of step 55 (FIG. 11). On the other hand, in a case where either has been set, the CPU 1-1 checks whether the telephone line 1-10 or the mobile communication unit 1-11 has been connected to the NCU 1-9 in step S25. If the telephone line 1-10 has been connected, the CPU 1-1 performs an operation of a line start key mode (FIG. 15) in step S26. If the mobile communication unit 1-11 has been connected, the CPU 1-1 performs an operation of a mobile communication start key mode (FIG. 16) in step S27.

Next, the CPU 1-1 performs an operation of a monitor select mode (FIG. 18) in step S28, performs an operation of releasing a power-save mode of the modem 1-8 in step S902, and then performs a mode initializing operation in step S903. The CPU 1-1 then discriminates whether an original document has been set in step S29. If so, the CPU 1-1 performs operation for the transmission mode (FIG. 34~FIG. 36) in step S30. If no original document has been set, the CPU 1-1 performs operation for the reception mode (FIG. 25~FIG. 27) in step S31.

Next, the CPU 1-1 performs the operation of setting the modem 1-8 to the power-save mode in step S904, stops the line-monitoring in step S32, and then returns to the standby condition.

Figure 15:
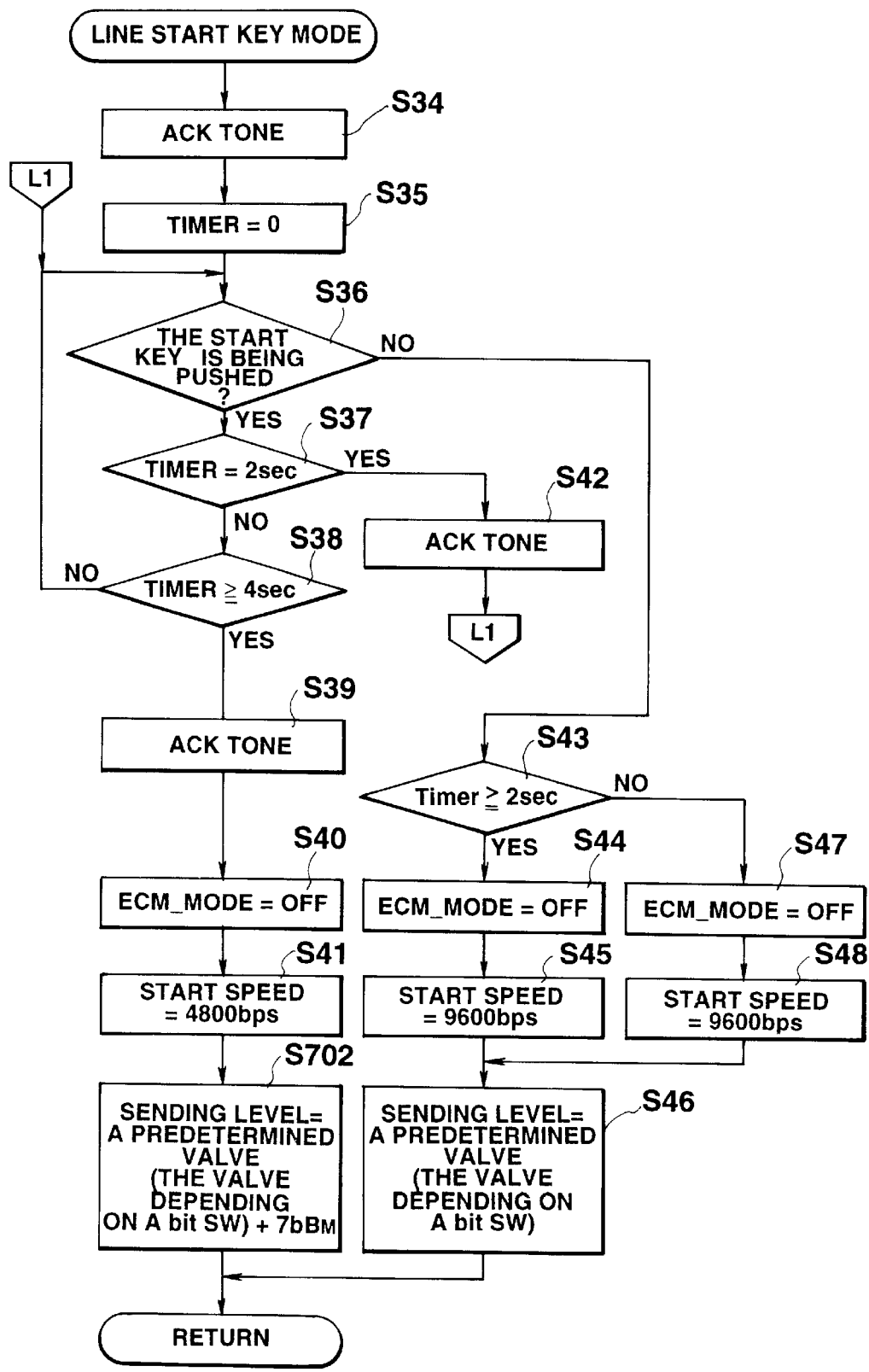
FIG. 15 is a flow chart showing an operation of a line start key mode.

FIG. 15 is a flow chart showing the operation of the line start key mode (step S26 of FIG. 14).

In step S34 of FIG. 15, the CPU 1-1 causes the buzzer 1-14 to generate a confirmation sound (an ACK tone) which indicates that the start key has been depressed, and in step S35, the CPU 1-1 initializes a timer (a software timer) to measure the time the start key remains depressed. While the start key is depressed the CPU 1-1 performs the processes of steps S36, S37 and S38. In step S37, the CPU 1-1 discriminates if the timer has counted two seconds. If so, the CPU 1-1 causes the buzzer 1-14 to generate the ACK tone in step S42, and then returns to step S36. In step S36, the CPU 1-1 discriminates if the start key is still depressed. If not, the CPU 1-1 discriminates whether the value of the timer is less than two seconds in step S43. On the other hand, in step S38, the CPU 1-1 discriminates whether the value counted by the timer is less than four seconds.

In a case where the timer has timed less than two seconds, the CPU 1-1 shifts from step S43 to step S47, sets a flag (ECM-MODE) to allow ECM communication in step S47, sets the communication speed at the start time to be 9600 bps in step S48, and then sets a level of transmitting a signal to be a predetermined value which is decided by bit switches (not shown) in step S46.

In a case where the value of the timer is greater than two seconds and less than four seconds, the CPU 1-1 shifts from step S43 to step S44, clears the flag ECM-MODE to prohibit the ECM communication in step S44, sets the communication speed at the start time to be 9600 bps in step S45, and then shifts to step S46.

In a case where of the timer has counted to four or more seconds, the CPU 1-1 shifts from step S38 to step S39, causes the buzzer 1-14 to generate the ACK tone in step S39, clears the flag ECM-MODE in step S40, sets the communication speed at the start time to be 4800 bps in step S41, sets the level at which the signal will be transmitted to be the predetermined value plus +7 dBm in step S702, and then returns to step S28 of FIG. 14. An operator can thereby manually select the communication mode (G3 or ECM) and the signal transmission level. In a case where an operator is aware that the communication is not good, he or she is able to select an appropriate communication mode and an appropriate level of transmission of the signal so that the time of the image communication will be shortened and the number of line errors will be decreased.

Figure 16:
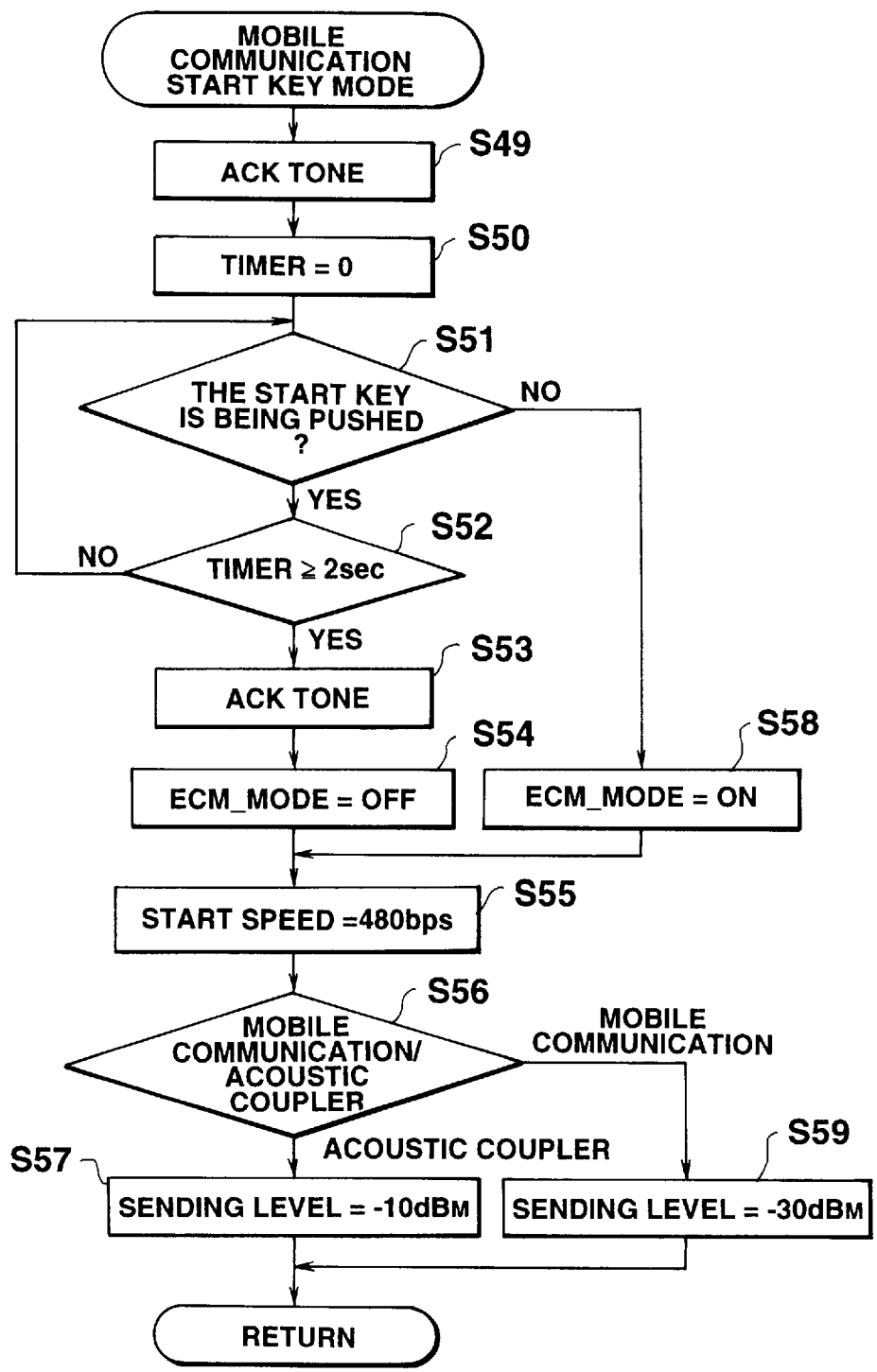
FIG. 16 is a flow chart showing an operation of a mobile communication start key mode.

FIG. 16 is a flow chart showing the operation of the mobile communication start key mode of step S27 in FIG. 14.

In step S49 of FIG. 16, the CPU 1-1 causes the buzzer 1-14 to generate the ACK tone. The CPU 1-1 then initializes the timer so as to measure the time at which the start key is depressed in step S50. While the start key is depressed, the CPU 1-1 performs the processes of step S51 and step S52.

In step S51, the CPU 1-1 discriminates whether the start key is continuously depressed, and in step S52, the CPU 1-1 discriminates whether the period measured by the timer is less than two seconds.

In a case where the time measured by the timer is two or more seconds, the CPU 1-1 causes the buzzer 1-14 to generate the ACK tone in step S53 and then clears the flag ECM-MODE in step S54. On the other hand, in a case where the start key is not depressed, the CPU 1-1 sets the flag ECM-MODE in step S58. Consequently, as in the mobile communication, the operator is able manually to select the communication mode (G3 or ECM).

In step S55, the CPU 1-1 sets the communication speed at the start time to be 4800 bps, and then, in step S56, the CPU 1-1 discriminates whether the mobile communication unit or the acoustic coupler is connected to the NCU 1-9.

In a case where the mobile communication unit is connected to the NCU 1-9, the CPU 1-1 sets the level for transmission to be −30 dBm. On the other hand, in a case where the acoustic coupler is connected to the NCU 1-9, the CPU 1-1 sets a level for transmission to be −10 dBm in step S57, and then returns to step S28 of FIG. 14.

As described above, the facsimile apparatus sets an appropriate communication mode in accordance with the type of communication line connected to the NCU 1-9 and the time of depression of the start key by an operator.

Figure 17:
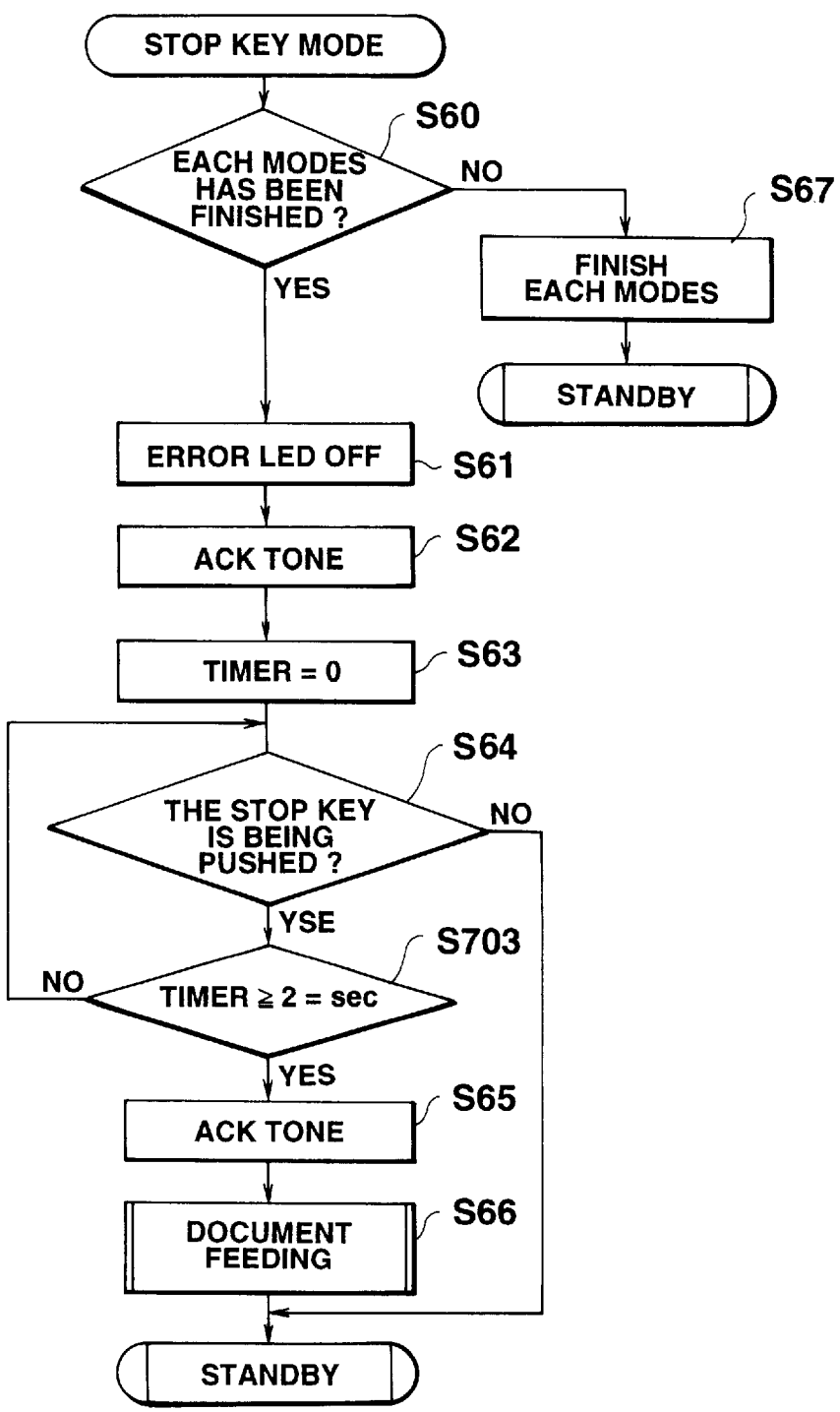
FIG. 17 is a flow chart showing an operation of a stop key mode.

FIG. 17 is a flow chart showing the operation of the stop key mode of step S23 (FIG. 12).

In step S60 of FIG. 17, the CPU 1-1 discriminates whether any local operation (i.e. copy operation) or any facsimile operation (i.e. facsimile transmission) is being performed. If an operation is being performed, the CPU 1-1 stops the operation in step S67, and then returns to the standby condition (step S5 of FIG. 11). On the other hand, if an operation is not being performed, the CPU 1-1 turns off the error LED of the operation unit 1-4 is step S61, causes the buzzer 1-14 to generate the ACK tone in step S62, and initializes a timer to measure the time of depression of the step key in step S63. Then, while the stop key is depressed, the CPU 1-1 repeatedly performs step S64 and step S703. In step S64, the CPU 1-1 discriminates whether the stop key has continuously remained depressed. In step S703, the CPU 1-1 discriminates whether the timer has counted less than two seconds. If so, the CPU 1-1 shifts from step S64 to the standby condition. On the other hand, when the timer has measured two seconds or more, the CPU 1-1 shifts from step S703 to step S65, causes the buzzer 1-14 to generate the ACK tone in step S65, performs the feeding operation of an original document in step S66, and then returns to the standby condition.

Figure 18:
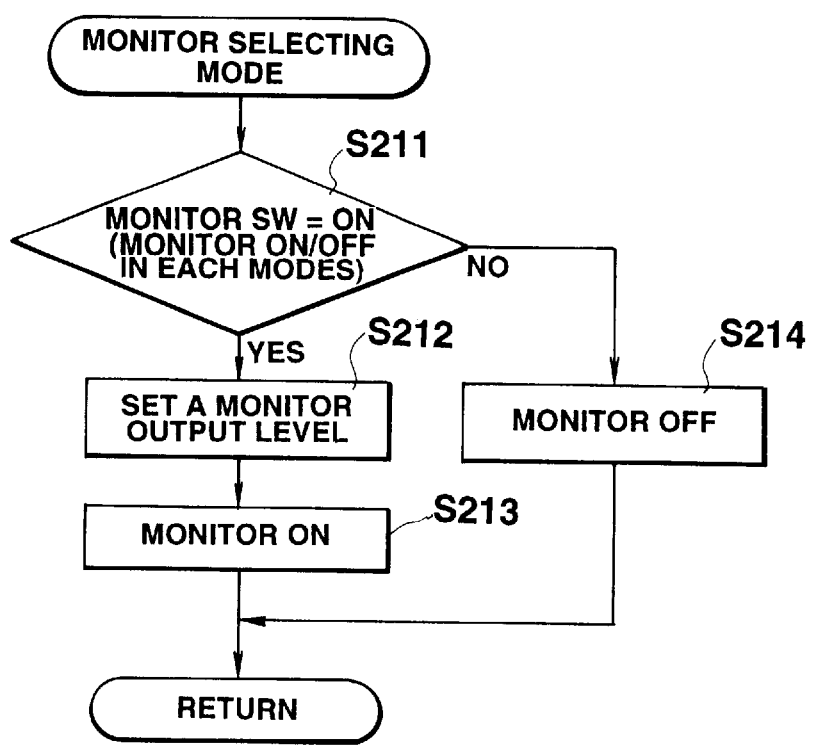
FIG. 18 is a flow chart showing an operation of a monitor selecting mode.
Figure 25:
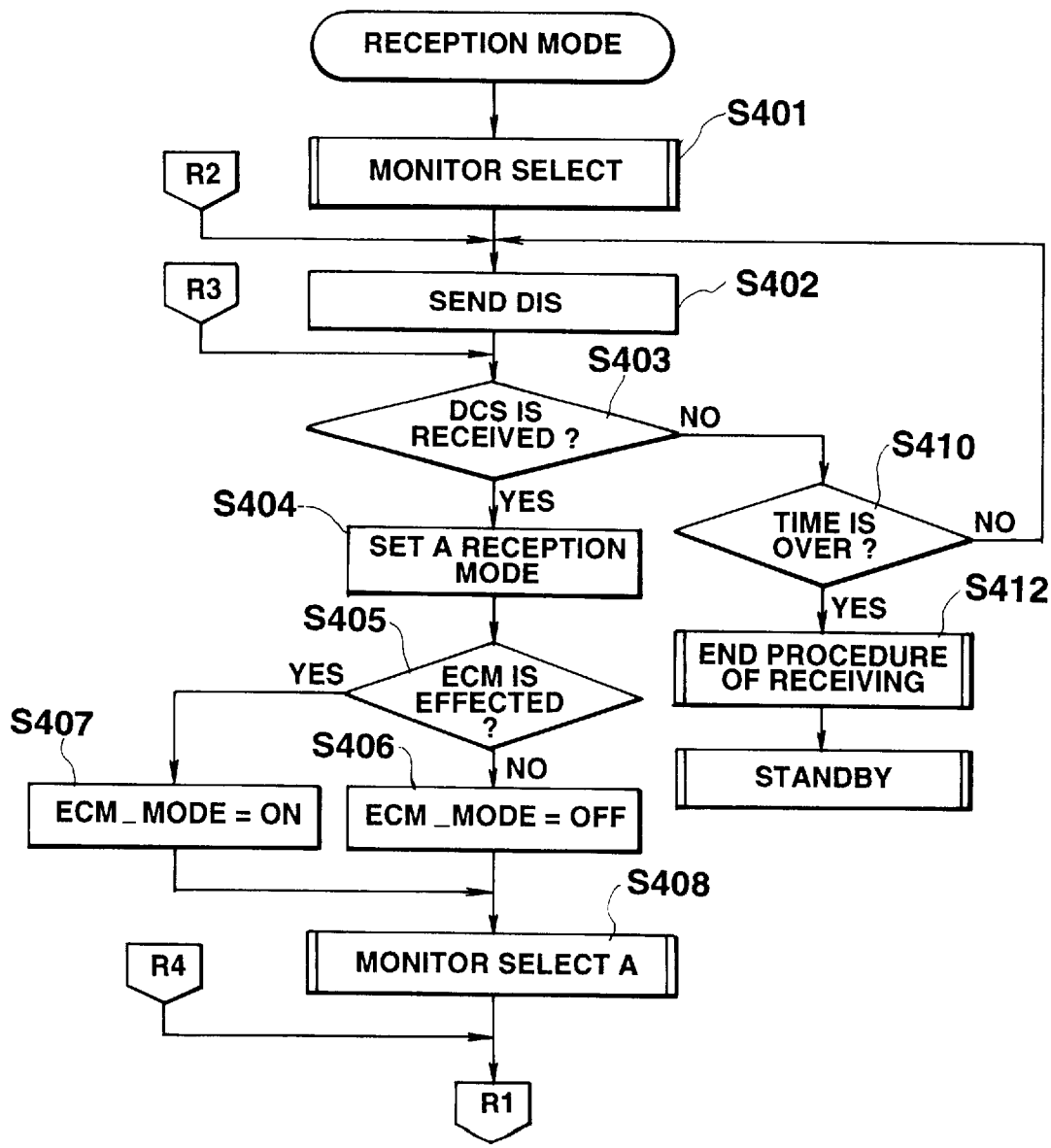
FIG. 25 through FIG. 27, FIG. 29 and FIG. 30 together form a flow chart showing an operation of a receiving mode.
Figure 34:
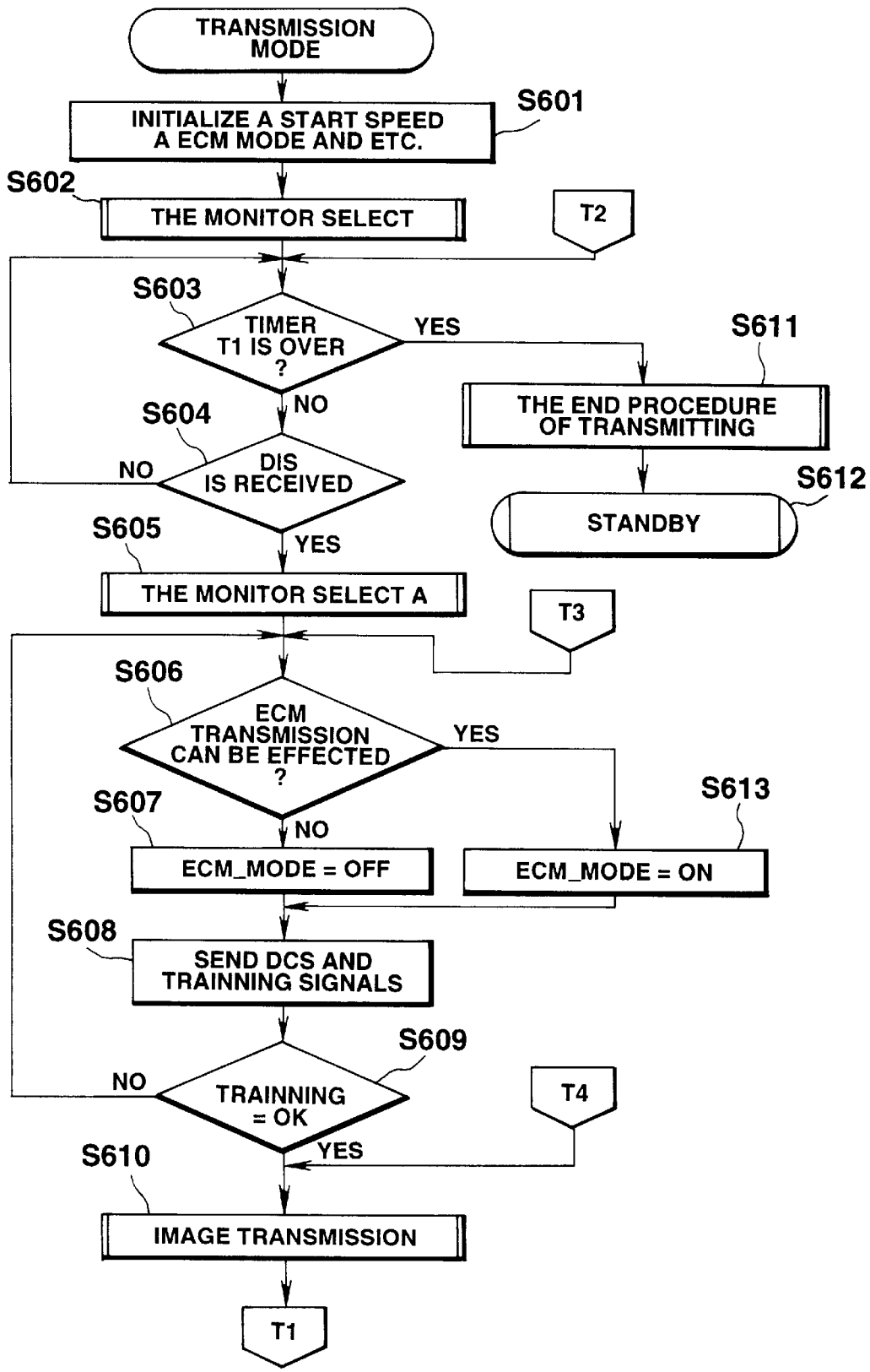
FIG. 34 through FIG. 36 together form a flow chart showing an operation of a transmission mode.

FIG. 18 is a flow chart showing the operation of the monitor select mode (step S11 of FIG. 11, step S28 of FIG. 14, step S401 of FIG. 25, or step S602 of FIG. 34).

In step S211 of FIG. 18, the CPU 1-1 discriminates whether the monitor SW (switch) is turned on. If the monitor SW is not turned on, the CPU 1-1 sets the monitor to off in step S214. On the other hand, if the monitor SW is turned on, the CPU 1-1 sets an output level for the monitor in step S212, and turns the monitor on in step S213.

Figure 19:
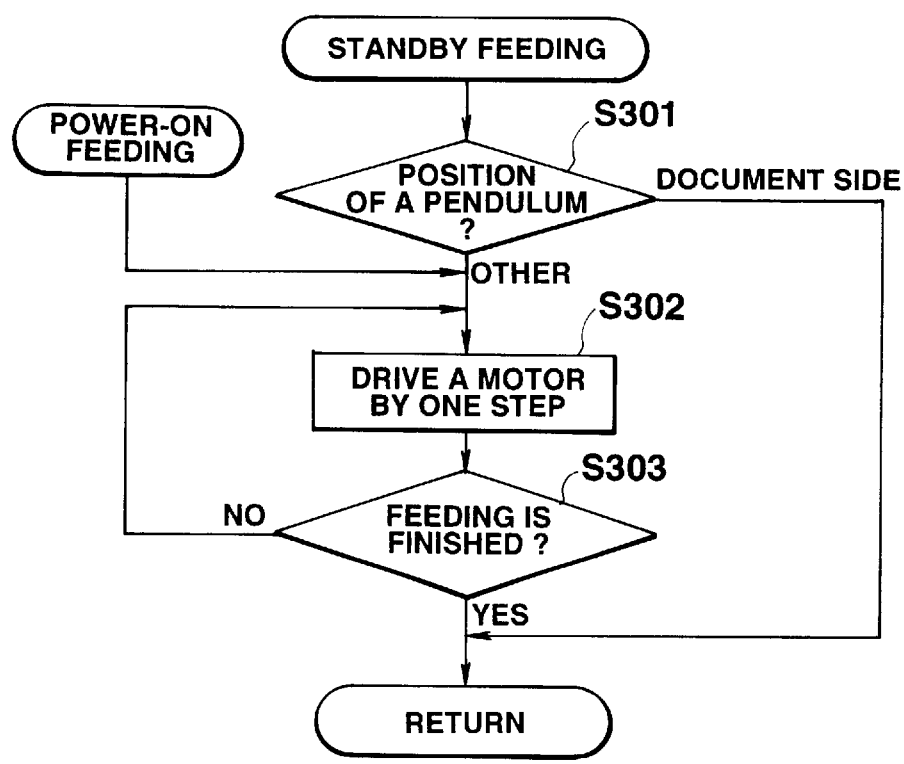
FIG. 19 is a flow chart showing an operation of a standby feeding mode and a power-on feeding mode.
Figure 20:
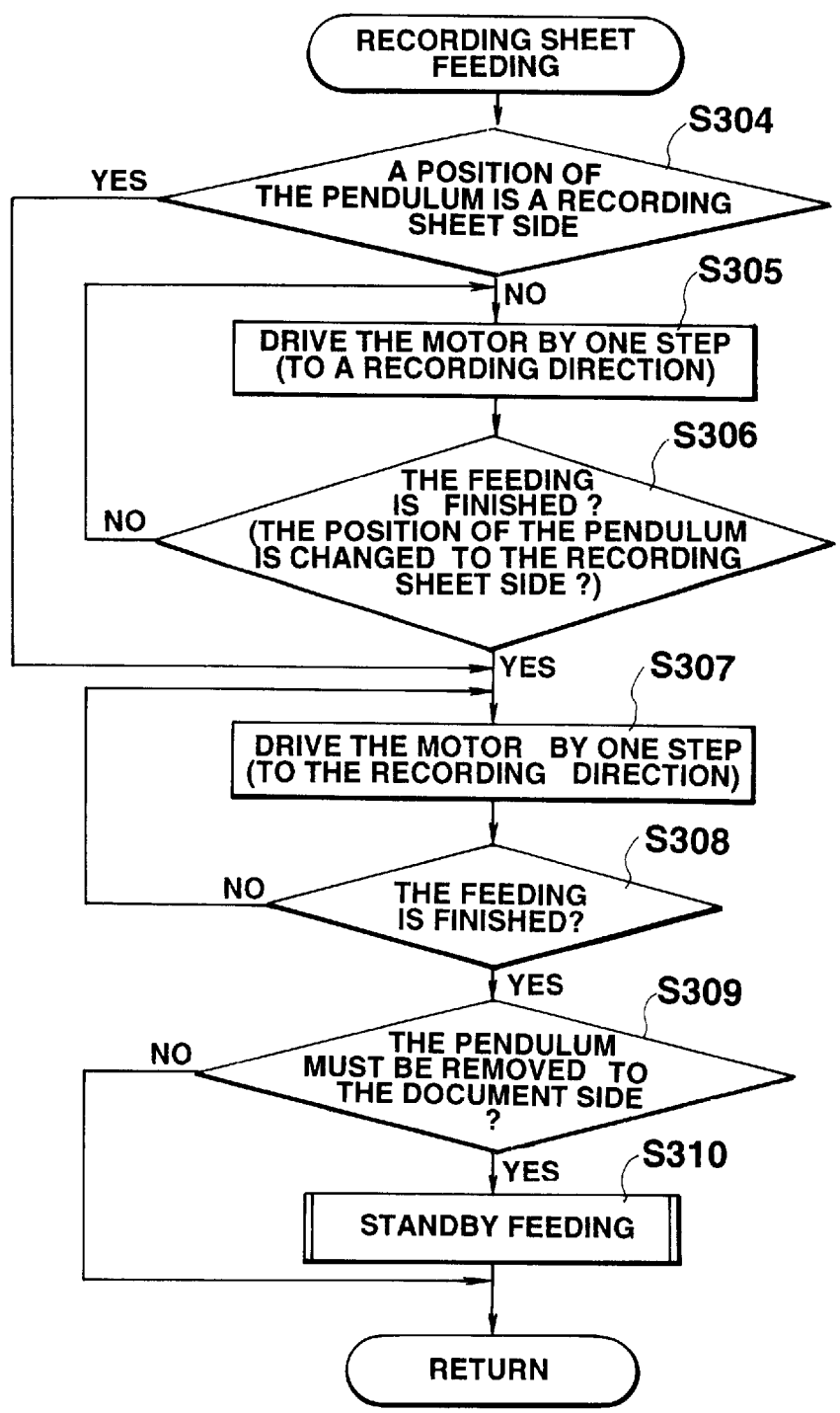
FIG. 20 is a flow chart showing a recording sheet feeding operation.
Figure 21:
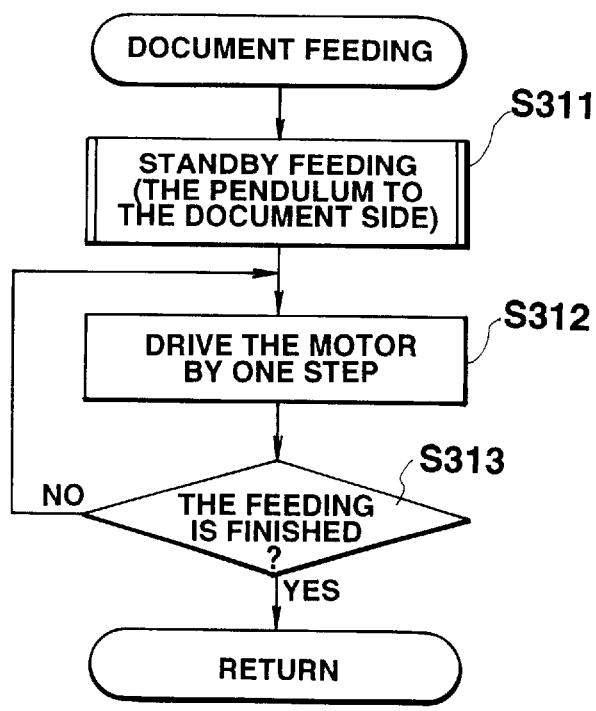
FIG. 21 is a flow chart showing a document feeding operation.

FIG. 19 is a flow chart showing the operation of the power-on feeding (step S2 of FIG. 10) and the standby feeding (step S310 of FIG. 20, step S311 of FIG. 21, etc.)

This facsimile apparatus has a structure in which one motor drives a roller for printing and a roller for reading by means of switching the power of the motor using a pendulum. In this facsimile apparatus, the feeding of an original document is operated on the basis of a positive rotation of the motor, while the feeding of a recording sheet is operated on the basis of negative rotation of the motor. The facsimile apparatus has a pendulum (a gear wheel) which switches a route of transfer of the driving power as between positive rotation and negative rotation. For positive rotation, the pendulum is located on a document side, to drive the roller for reading, while for negative rotation, the pendulum is located on a recording sheet side, to drive the roller for printing. The initial position of the pendulum is the document side, and for negative rotation, the pendulum is shifted to the recording sheet side by a rotation of the motor (a feeding operation). Switching from the recording sheet side to the document side also is performed by the rotation of the motor. In addition, when a document or a recording sheet which has been inserted into the facsimile apparatus is removed by an operator, the pendulum is moved to an intermediate position between the document side and the recording sheet side. The structure of the pendulum prevents feeding of the recording sheet during image transmission.

In step S301 of FIG. 19, the CPU 1-1 discriminates whether the pendulum is positioned at the document side. If the pendulum is at the document side, the CPU 1-1 returns to the previous flow. On the other hand, if the pendulum is not at the document side, the CPU 1-1 operates the motor (e.g. a positive rotation) so as to move the pendulum to the document side in step S302. In step S303, the CPU 1-1 detects the position of the pendulum. The CPU 1-1 then repeatedly performs steps S302 and S303 until the CPU 1-1 detects that the position of the pendulum is at the document side.

In the standby mode, the CPU 1-1 starts from step S301. On the other hand, in the power-on mode, the CPU 1-1 starts from step S302 because the position of the pendulum is uncertain when the power is turned on. Therefore, the CPU 1-1 drives the motor (step motor) by fixed steps so as to fix the position of the pendulum.

FIG. 20 is a flow chart showing the process of feeding of the recording sheet (e.g. step S71 of FIG. 13).

In step S304, the CPU 1-1 checks the position of the pendulum. In a case where the pendulum is not at the recording sheet side, the CPU 1-1 drives the motor by one step in step S305, and again checks the pendulum position in step S306. The CPU 1-1 then repeatedly performs steps S305 and S306 until the CPU 1-1 detects that the pendulum is at the recording sheet side.

In a case where the position of the pendulum is at the recording sheet side, the CPU 1-1 drives the motor by one step in step S307, and checks if a fixed feeding operation is finished in accordance with the detection of a sensor in step S308. The CPU 1-1 then repeatedly performs steps S307 and S308 until the CPU 1-1 detects that the fixed feeding operation is finished. Then in step S307, the CPU 1-1 checks whether the pendulum should be on the document side or the recording sheet side after the feeding operation. In an initial feeding operation of a copy operation or a facsimile reception, the pendulum must be on the recording sheet side because the printing operation is performed after the feeding operation. In the feeding of the recording sheet with the copy key in the standby condition, the pendulum must be returned to the document side. In a case where the pendulum must be returned to the document side, the CPU 1-1 performs the operation of the standby feeding mode (FIG. 19) in step S310, and then returns to the previous flow.

FIG. 21 is a flow chart showing the document feeding operation (e.g. step S66 of FIG. 17).

In step S311 of FIG. 21, the CPU 1-1 performs the standby feeding operation, and thereby switches the pendulum to the document side. In step S312, the CPU 1-1 drives the motor for feeding by one step, thereby feeding the document. In step S313, the CPU 1-1 checks whether the document feeding operation is finished. In a case where the CPU 1-1 detects that the feeding operation is finished, the CPU 1-1 returns from step S313 to the previous flow.

Figure 22:
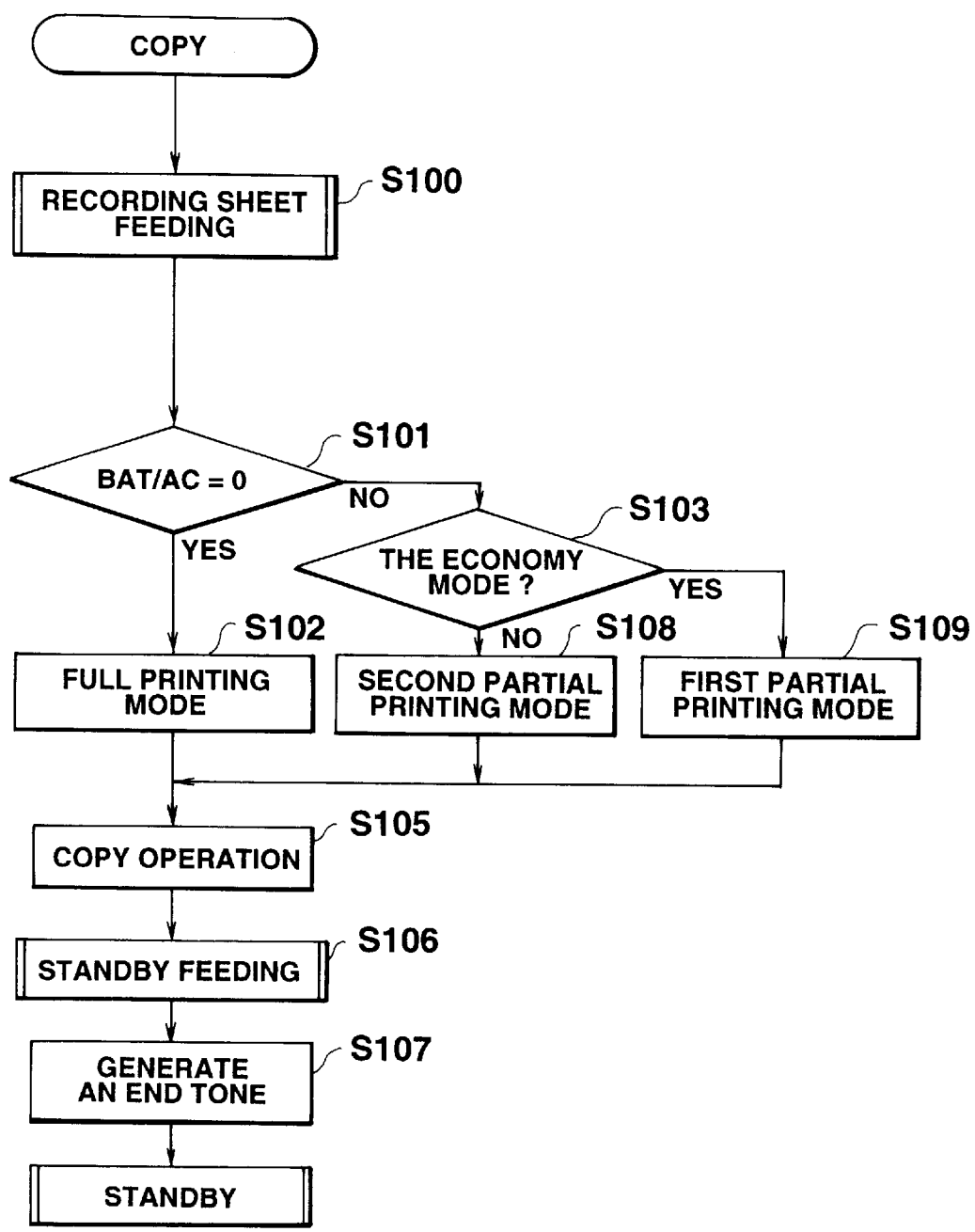
FIG. 22 is a flow chart showing a copy operation.

FIG. 22 is a flow chart showing the copy operation (step S701 of FIG. 13).

In step S100 of FIG. 22, the CPU 1-1 performs the recording sheet feeding operation (FIG. 20), thereby feeding the recording sheet to a predetermined position of the recorder 1-6. In step S101, the CPU 1-1 checks the value of a signal BAT/AC which indicates an AC power or the battery power. When AC power is used, the signal BAT/AC becomes "1" because the signal BAT/AC which is pulled up +5V is connected to a ground line by the connecting terminal of the AC power unit. On the other hand, in a case where the battery power is used, the signal BAT/AC becomes "1". In a case where a car battery is used, the signal BAT/AC depends on a switch of the car battery power unit. When the capacity of the car battery is large, the switch is turned on so that the signal BAT/AC becomes "0". On the other hand, when the capacity of the car battery is small, the switch is turned off so that the signal BAT/AC becomes "1".

If the value of the signal BAT/AC is "0" in step S101, the CPU 1-1 sets the full printing mode in step S102. If the value of the signal BAT/AC is "1", the CPU 1-1 discriminates whether the economy mode is selected in step S103. When the economy mode is selected, the CPU 1-1 sets a partial printing mode (first partial printing mode) which is to print data partially in step S109. When the economy mode is not selected, the CPU 1-1 sets a different partial printing mode (second partial printing mode) which prints data partially when black ratio data to be printed is over fifty percent in step S108. The CPU 1-1 then performs the copying operation in step S105, performs the standby feeding operation in step S106, causes the buzzer 1-14 to generate an end tone which indicates that the copy operation is terminated in step S107, and then returns to the standby condition. The first partial printing mode and the second partial printing mode save energy when battery or a car battery is used. These two modes are also used when printing received image data.

Figure 23:
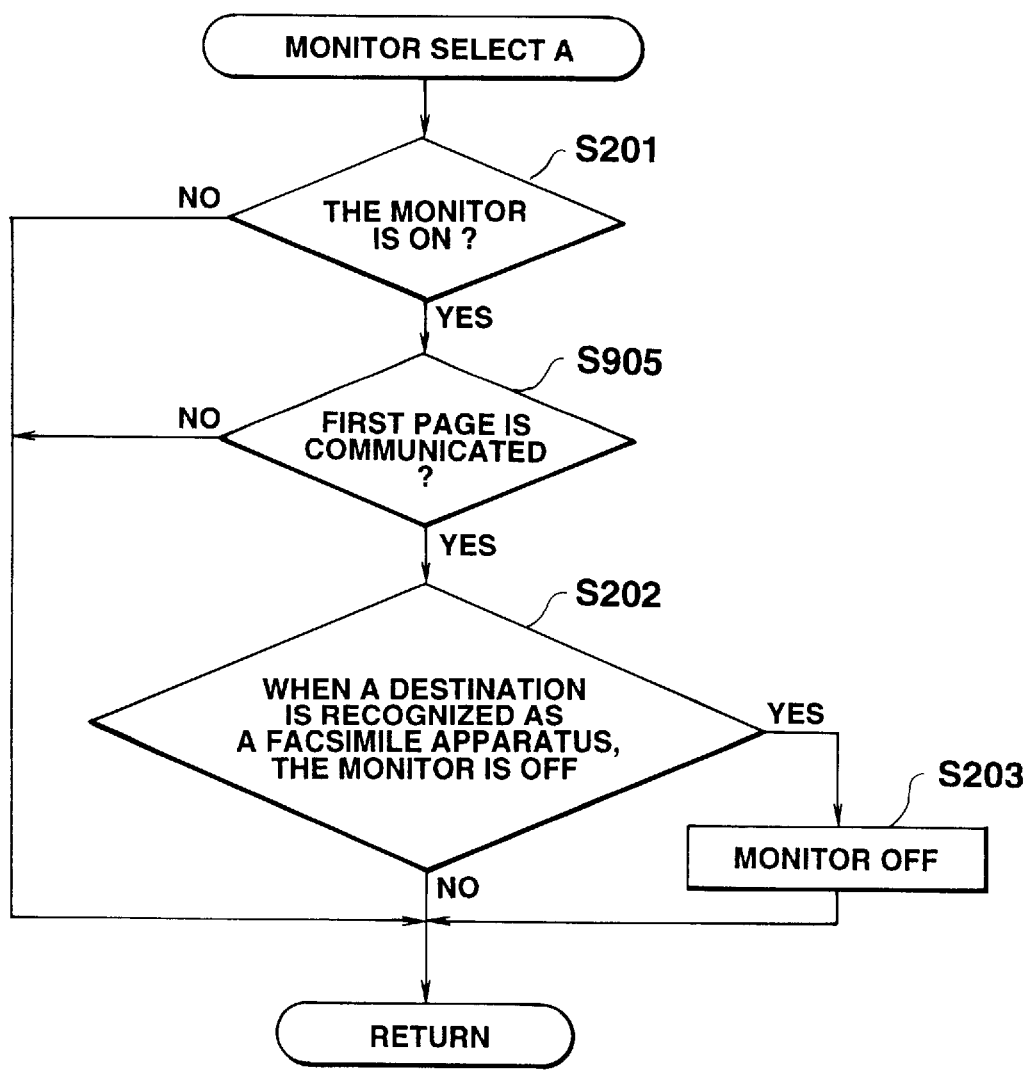
FIG. 23 is a flow chart showing an operation of a monitor selection A.

FIG. 23 is a flow chart showing an operation of a monitor selecting mode A (step S408 of FIG. 25, step S605 of FIG. 34).

In step S201 of FIG. 23, the CPU 1-1 discriminates whether the monitor has been turned on.

In a case where the monitor has been turned on, the CPU 1-1 checks whether a first page is being received in step S905. If the first page is being received, the CPU 1-1 discriminates whether the destination is a facsimile machine in step S202. If the destination is a facsimile machine, the CPU 1-1 turns the monitor off in step S203.

Figure 24:
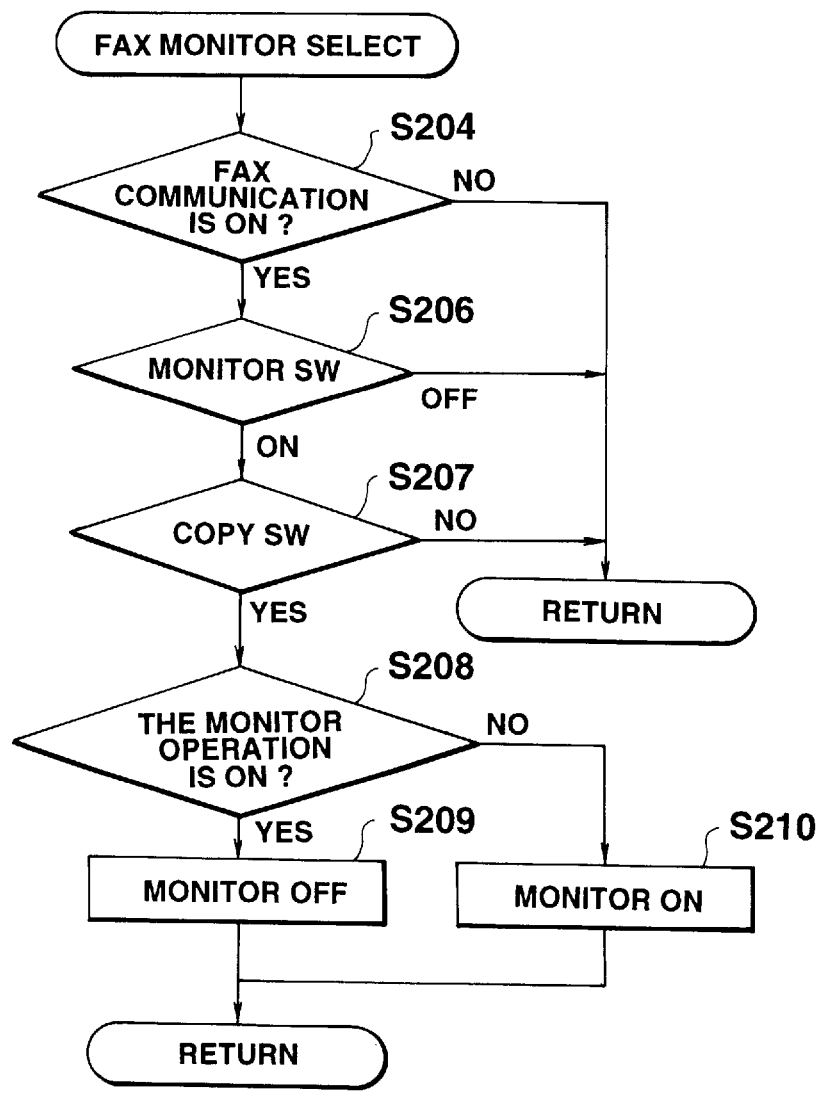
FIG. 24 is a flow chart showing an operation of a FAX monitor selection.

FIG. 24 is a flow chart showing the operation of a FAX monitor selecting mode which turns the monitor on and off by the copy key during facsimile communication.

In step S204 of FIG. 24, the CPU 1-1 checks whether facsimile communication is being performed. In a case where facsimile communication is being performed, the CPU 1-1 checks whether the copy key is being pushed in step S207. If the copy key is depressed, the CPU 1-1 checks whether a monitor operation is being performed in step S208. If so, the CPU 1-1 stops the monitor operation in step S209. On the other hand, in a case where the monitor operation is not being performed, the CPU 1-1 starts monitor operation in step S210.

FIGS. 25 through 33 together form a flow chart showing the operation of the reception mode (step S31 of FIG. 14).

In step S401 of FIG. 25 the CPU 1-1 performs the monitor selecting mode (FIG. 18), sends to the destination a DIS which includes information on the communication speed and the ECM set in the start key mode in step S402, and checks whether a DCS has been received from the destination in step S403. If a DCS has not been received, the CPU 1-1 checks whether an initial identification time-out (e.g. 35 seconds) has occurred in step S410. If so, the CPU 1-1 performs an end procedure of the image reception in step S412, and then returns to the standby condition.

In a case where a DCS has been received from the destination before the initial identification timer has expired, in step S404 the CPU 1-1 sets an image reception mode in accordance with information included in the received DCS. In step S405, the CPU 1-1 discriminates whether ECM communication is being performed. If so, the CPU 1-1 sets the flag ECM-MODE in step S407. On the other hand, in a case where ECM communication is not being performed, the CPU 1-1 clears the flag ECM-MODE in step S406. In step S408, the CPU 1-1 performs the operation of the monitor selecting mode A, and thereby decides if the monitor is operated. Then, in step S413 of FIG. 26, the CPU 1-1 discriminates whether ECM communication is being performed, in accordance with the flag ECM-MODE. If the flag ECM-MODE is on, the CPU 1-1 shifts from step S413 to step S433 of FIG. 29, and performs ECM reception. On the other hand, if the flag ECM-MODE is not on, the CPU 1-1 performs normal facsimile reception in step S414, and checks whether a recording sheet is in the recorder 1-6 in step S415. If a recording sheet is in the recorder 1-6, the CPU 1-1 causes the recorder 1-6 to print one line of received image data in step S418 and checks whether the line of received image data has been printed in step S419. If the line of received image data has not yet been printed, the CPU 1-1 returns to step S414 so as to continue to receive and print image data. On the other hand, if the line has been printed, the CPU 1-1 checks whether an RTC is detected or not in received data in step S420. If no RTC is detected, the CPU 1-1 returns to step S414 so as to continue to monitor signals. In a case where the RTC is detected in step S420, the CPU 1-1 shifts from steps S420 to step S421 of FIG. 27 and then performs the next procedure.

Figure 27:
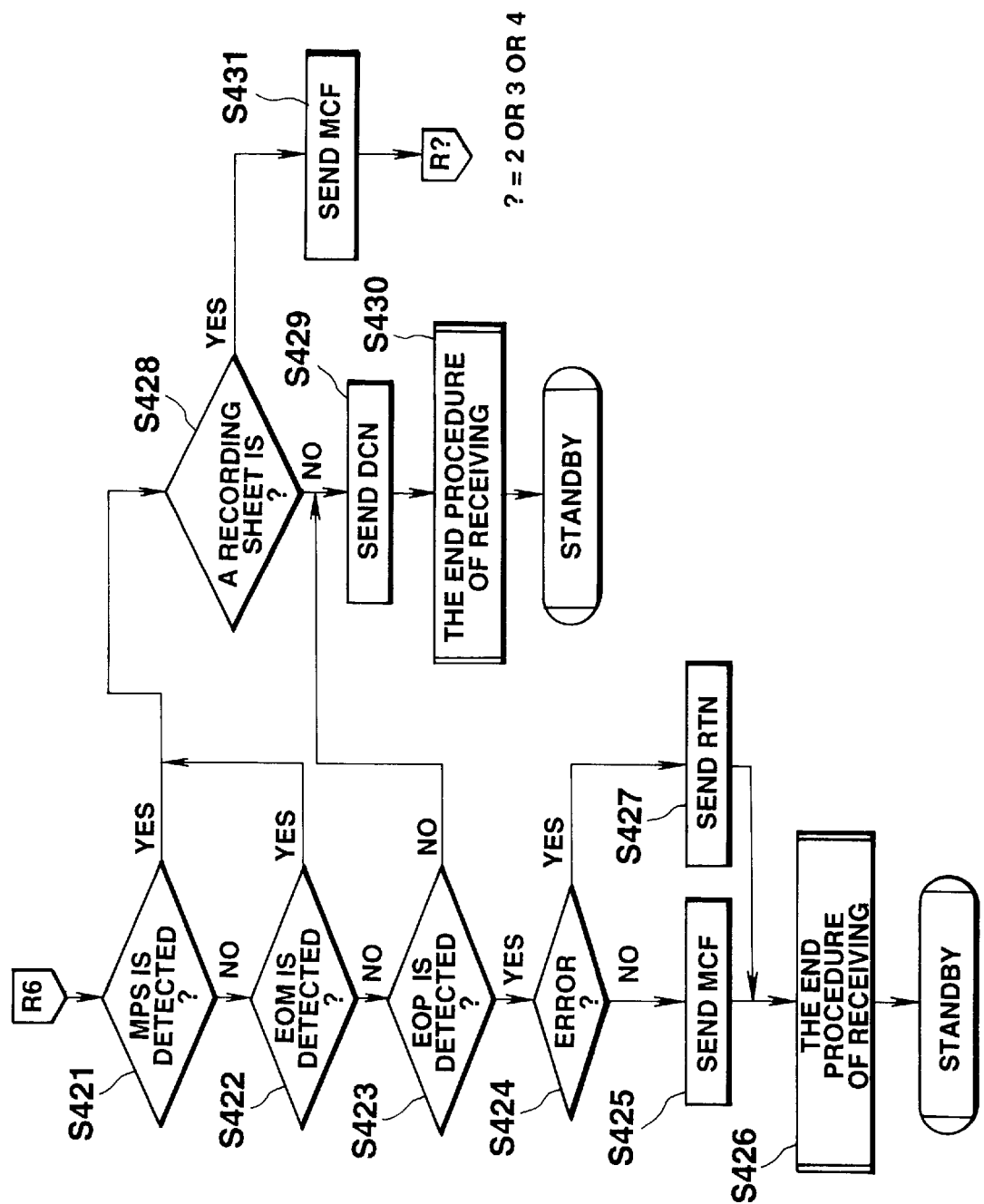

On the other hand, in a case where the recording sheet is not in the recorder 1-6 in step S415, the CPU 1-1 performs an operation of an operator call A (FIG. 28) so as to require an operator to set a recording sheet in step S416. In the operator call A operation, the CPU 1-1 stores received image data in an image memory (RAM 1-3) until a recording sheet is set by the operator. Then, in step S417, the CPU 1-1 checks whether the recording sheet is in the recorder 1-6, and if so, the CPU 1-1 shifts to step S418 so as to continue to print the received image data. If no recording sheet is in the recorder 1-6, the CPU 1-1 shifts from step S417 to step S421 (FIG. 27).

In steps S421, S422 and S423, the CPU 1-1 checks whether an MPS, an EOM or an EOP, respectively, is detected. When these signals are not detected, the CPU 1-1 sends a DCN to the line through the modem 1-8 and the NCU 1-9 in step S429, performs the end procedure of receiving (FIG. 33) in step S430, and then returns to the standby condition.

If the EOP is detected in step S423, the CPU 1-1 checks whether the quality of the received image data is satisfactory in step S424. When the quality of the received image data is adequate, the CPU 1-1 sends an MCF to the line through the modem 1-8 and the NCU1-9 in step S425. When the quality of the received image is unsatisfactory (i.e. the received image data has more errors than permitted by a predetermined standard), the CPU 1-1 sends an RTN to the line in step S427. The CPU 1-1 then performs the end procedure of receiving in step S426, and returns to the standby condition.

In a case where the MPS or the EOM is detected in step S421 or step S422, the CPU 1-1 checks whether a recording sheet is in the recorder 1-6 in step S428. If so, the CPU 1-1 sends the MCF to the line in step S431, and then shifts to step S402, step S403 or step S413. When the EOM is detected in step S422, the CPU 1-1 shifts from step S431 to step S402 or step S403. When the MPS is detected in step S421, the CPU 1-1 shifts from step S431 to step S413.

On the other hand, in a case where no recording sheet is in the recorder 1-6 in step S428, the CPU 1-1 sends the DCN to the line in step S429, performs the end procedure of receiving in step S430, and then returns to the standby condition.

Figure 26:
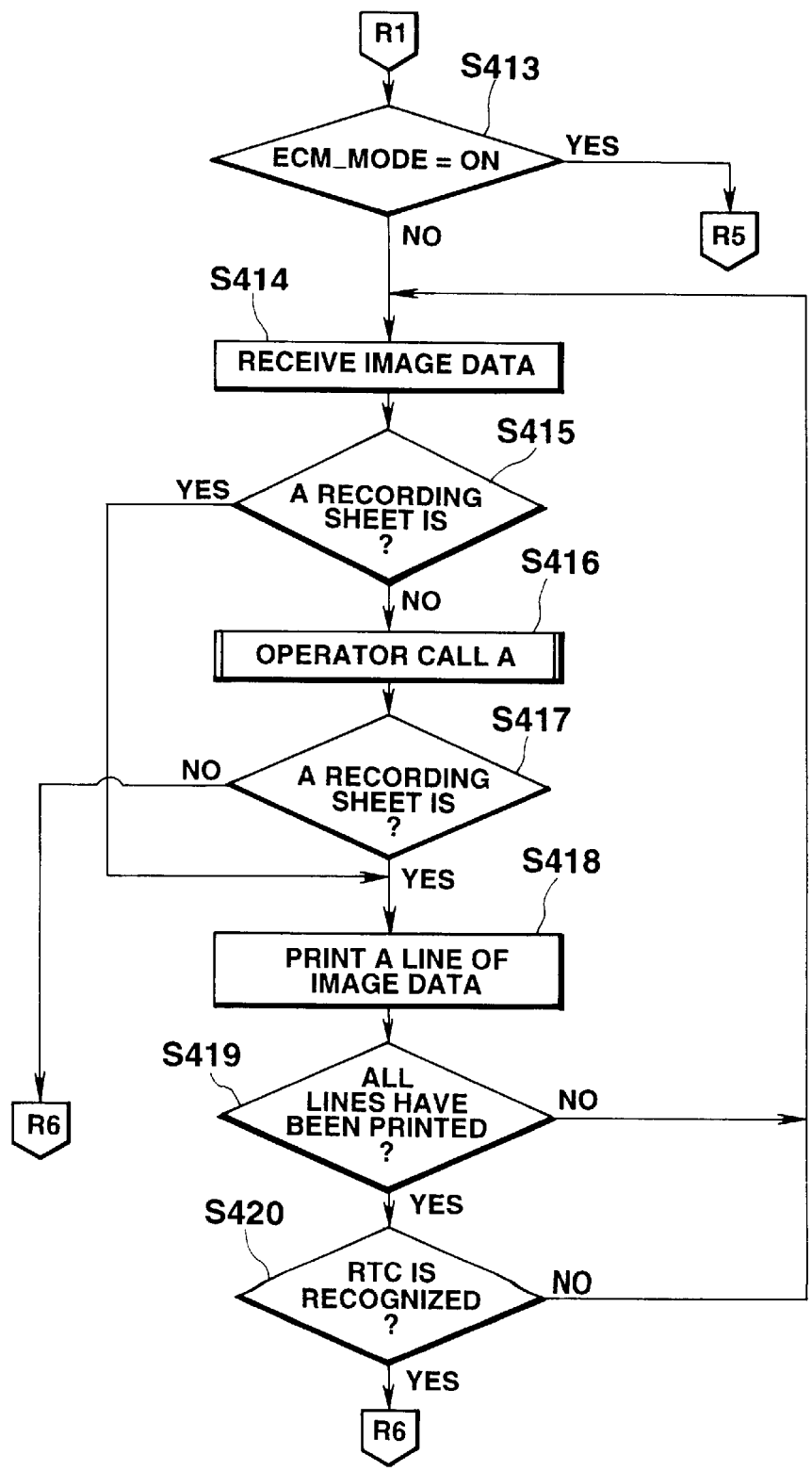
Figure 28:
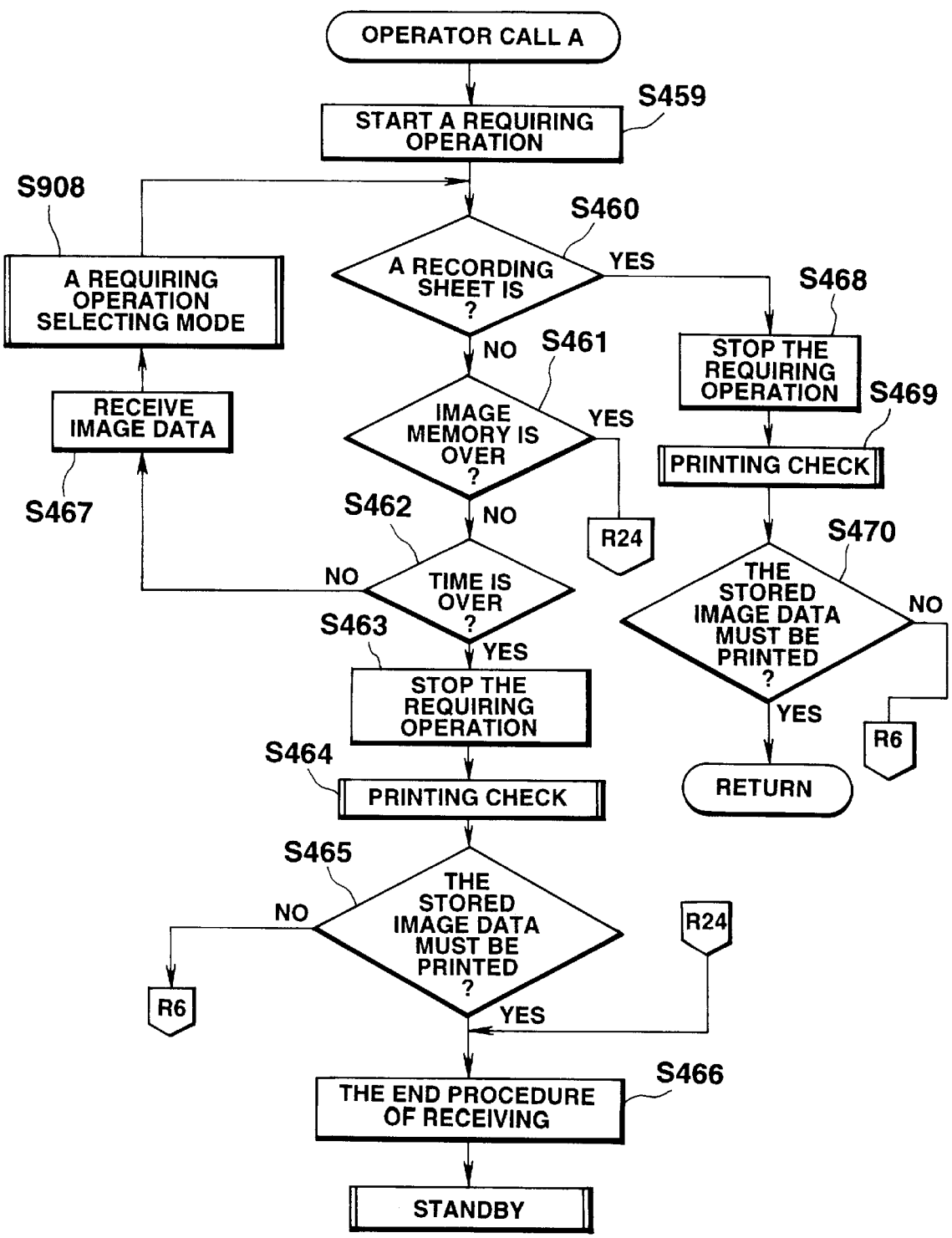
FIG. 28 is a flow chart showing an operation of an operator call A.

FIG. 28 is a flow chart showing the operation of the operator call A (step S418 of FIG. 26).

In step S459 of FIG. 28, the CPU 1-1 starts a requiring operation which requires an operator to set a recording sheet in the recorder 1-6, and which generates an alarm tone and/or displays an alarm.

In step S460 the CPU 1-1 checks whether a recording sheet is set in the recorder 1-6. In a case where a recording sheet is not set, in step S461 the CPU 1-1 checks the capacity of the image memory which is available to store received image data. If the capacity of the image memory is above a predetermined quantity, the CPU 1-1 checks the time elapsed from the start of the requiring operation in step S462.

In a case where a recording sheet is not set in step S460, where there is image memory available in step S461, and where the time is not more than a predetermined time (e.g. 5 seconds) in step S462, the CPU 1-1 receives image signals and stores received image data in the image memory in step S467, performs a requiring operation switching mode (FIG. 42) in step S908, and then returns to step S460.

If a recording sheet is set in the recorder 1-6 in step S460, the CPU 1-1 stops the requiring operation in step S468, checks stored image data to be printed in step S469, and discriminates whether the stored image data must be printed in step S470. If the printing operation must be performed, the CPU 1-1 returns from step S470 to step S417 of FIG. 26. If printing does not need to be performed, the CPU 1-1 shifts from step S470 to step S421 of FIG. 27. For example, when one page of image data has been received (the RTC has been received), or when the quantity of the stored image data is less than a predetermined amount, the CPU 1-1 determines not to print the stored image data.

In a case where image memory is not available in step S461, the CPU 1-1 performs the end procedure of receiving in step S466, and then returns to the standby condition.

In a case where the time elapsed from the start of the requiring operation is more than the predetermined time in step S462, the CPU 1-1 stops the requiring operation in step S463, checks the stored image data to be printed in step S464, and discriminates whether the stored image data must be printed in step S465, If the stored data must be printed, the CPU 1-1 performs the end procedure of receiving in step S466, and then returns to the standby condition On the other hand, if the stored image data need not be printed, the CPU 1-1 shifts from step S465 to step S421 of FIG. 27.

Figure 29:
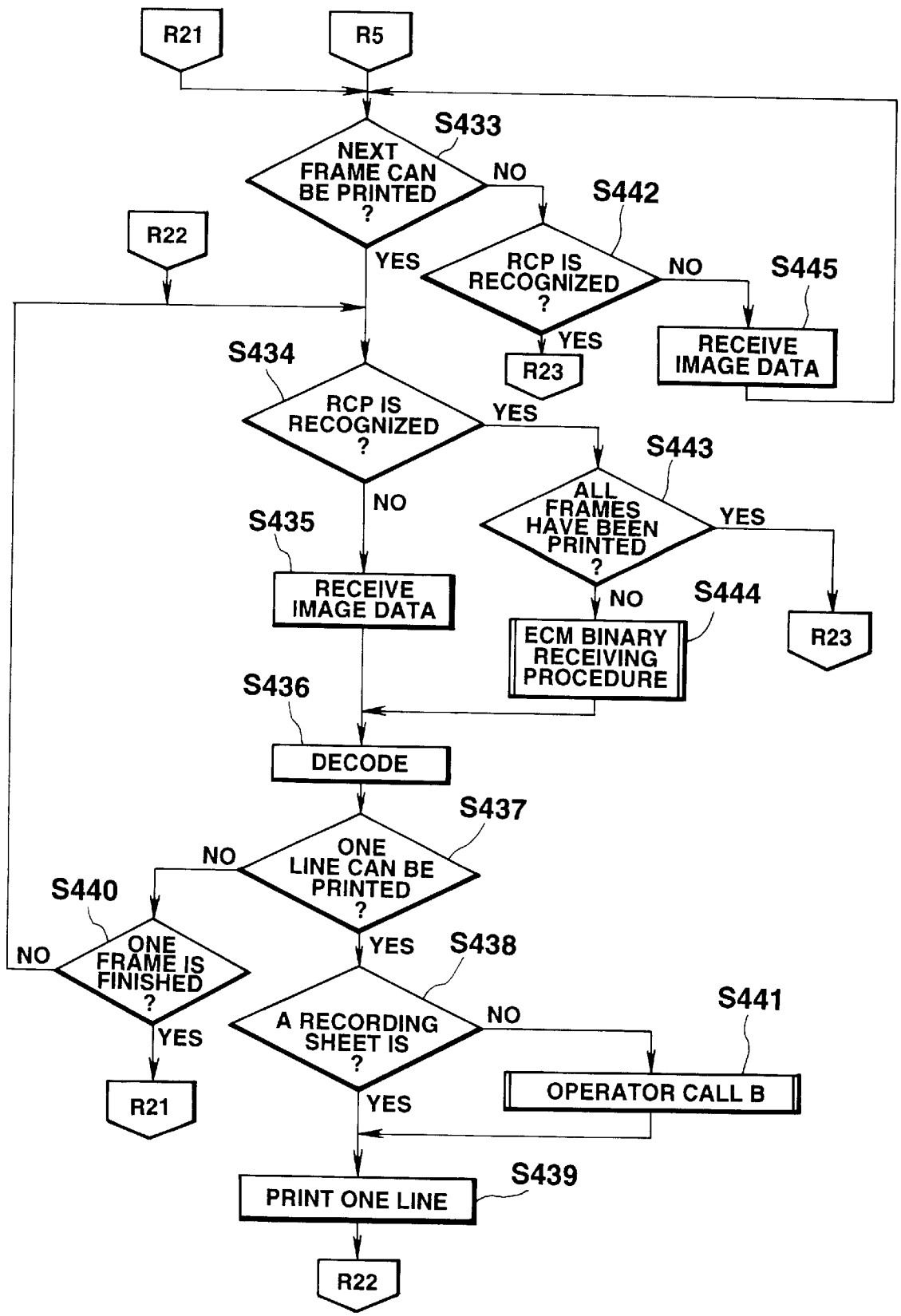

When the ECM reception is performed in step S413 of FIG. 26, the CPU 1-1 discriminates whether received frame data is capable of being printed in step S433 of FIG. 29. If the received frame data cannot be printed, the CPU 1-1 checks whether an RCP has been received in step S442. If no RCP is received, the CPU 1-1 receives image signals in step S445, and then returns to step S433. If the RCP is received in step S442, the CPU 1-1 shifts to step S446 of FIG. 30, and then performs a procedure of phase D.

On the other hand, if the received frame data can be printed in step S433, the CPU 1-1 checks whether the RCP has been received in step S434. If no RCP is received, the CPU 1-1 receives image signals in step S435. If an RCP is received, the CPU 1-1 checks whether all frame data has been printed in step S443, If less than all frame data has been printed, the CPU 1-1 shifts from step S443 to step S446 of FIG. 30. If all frame data has been printed, in step S444 the CPU 1-1 performs an ECM binary receiving procedure (FIG. 31) which is to perform flow control.

Then, in step S436, the CPU 1-1 decodes the received image data, and checks whether one line of image data is decoded and whether the line of image data is able to be printed in step S437. If one line of image data has not been decoded in step S437, the CPU 1-1 checks whether the decoding of one frame data is finished in step S440. If one frame of data is finished, the CPU 1-1 shifts from step S440 to step S433. If the decoding of one frame of data is not finished, the CPU 1-1 returns to step S434.

In a case where one line of image data is decoded, and where the line of image data is able to be printed, the CPU 1-1 checks whether a recording sheet is in the recorder 1-6 in step S438. If so, the CPU 1-1 causes the recorder 1-6 to print the line of image data in step S439, and then returns to step S434. On the other had, if no recording sheet is in the recorder 1-6, the CPU 1-1 performs an operation of an operator call B (FIG. 32) in step S441. In a case where a recording sheet is set in the procedure operator call B, the CPU 1-1 shifts to step S430.

Figure 30:
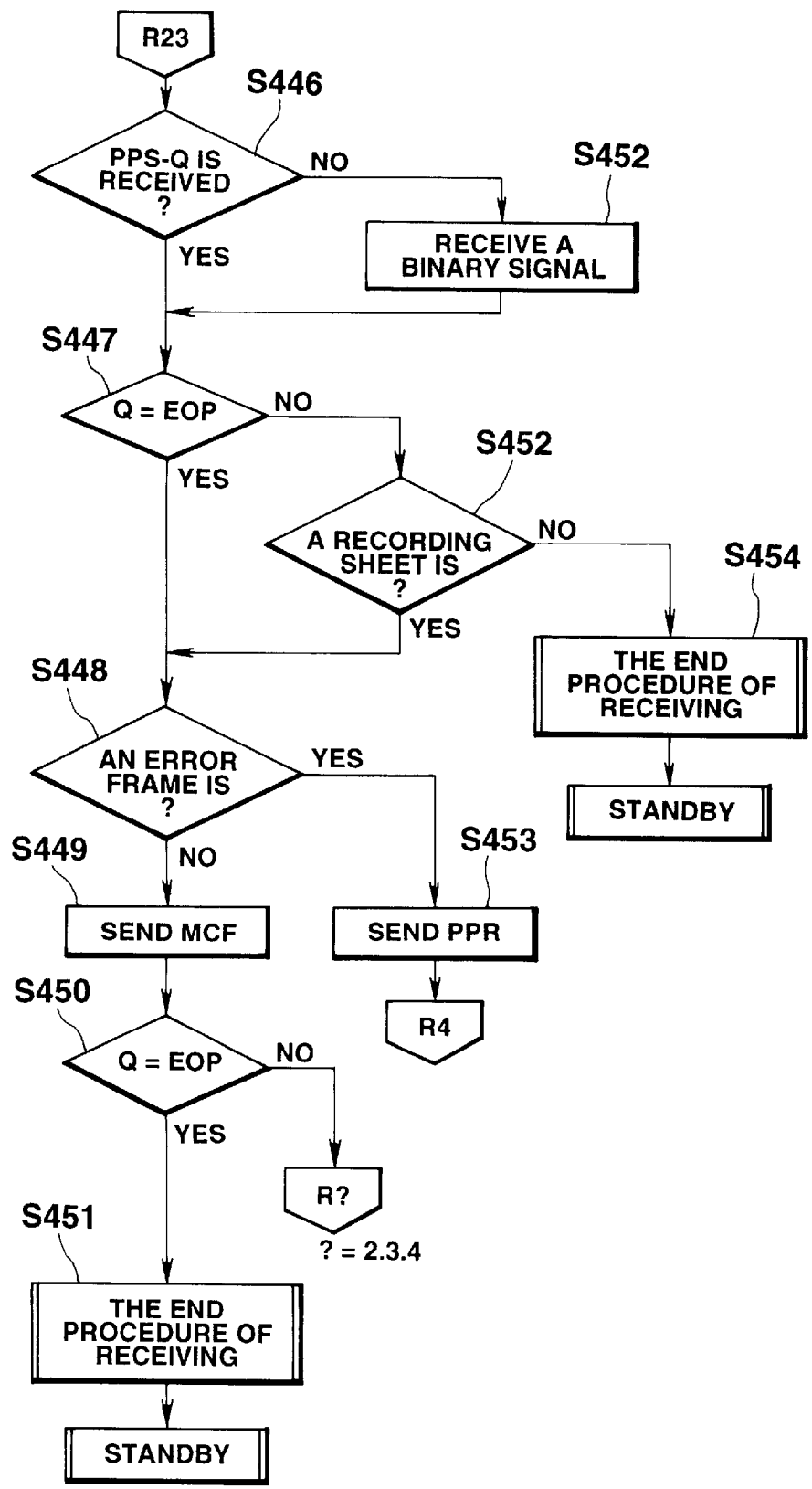

In step S446 of FIG. 30 the CPU 1-1 checks whether a PPS-Q (Q is EOP, EOM, MPS or NULL) is received, and if the PPS-Q is not received, the CPU 1-1 receives a binary signal in step S452.

In step S447, the CPU 1-1 checks whether the received binary signal is the PPS-EOP.

In a case where the received binary signal is not the PPS-EOP, and where the received binary signal is the PPS-NULL, the PPS-MPS, or the PPS-EOM, the CPU 1-1 checks whether a recording sheet is in the recorder 1-6 in step S452. If no recording sheet is in the recorder 1-6, the CPU 1-1 performs the end procedure of receiving in step S454 and then returns to the standby condition.

On the other hand, in a case where the received binary signal is the PPS-EOP in step S447, or where a recording sheet is in the recorder 1-6 in steps S452, the CPU 1-1 checks whether any error frame is in the received data in step S448. If an error frame is in the received data, the CPU 1-1 sends a PPR to the line through the modem 1-8 and the NCU1-9 in step S453, and returns to step S413 (FIG. 26) to receive a frame retransmitted from the destination. If no error frame is in the received data, the CPU 1-1 sends the MCF to the line in step S449, and checks whether the received binary signal is the PPS-EOP in step S450. If the received binary signal is the PPS-EOP, the CPU 1-1 performs the end procedure of receiving in step S451, and then returns to the standby condition. If the received binary signal is not the PPS-EOP, the CPU 1-1 shifts to step S402, step S403 or step S413 in accordance with the type of received binary signal.

Figure 31:
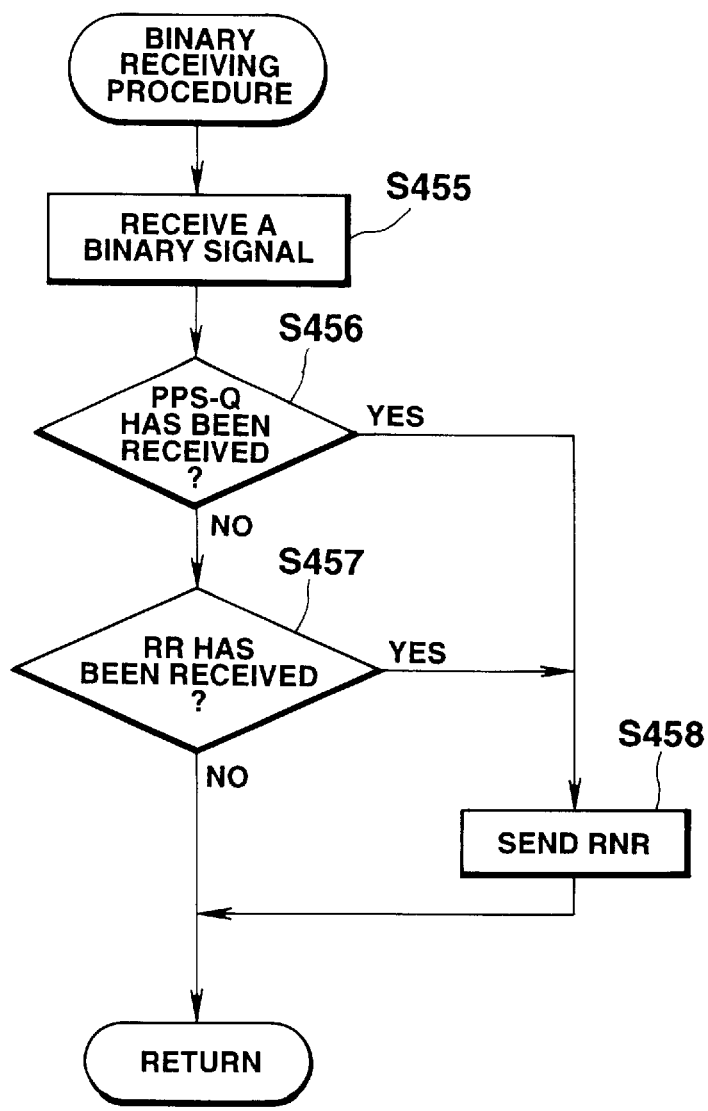
FIG. 31 is a flow chart showing an ECM binary receiving procedure.

FIG. 31 is a flow chart showing the operation of the ECM binary receiving procedure (e.g. step S444 of FIG. 29).

This ECM binary receiving procedure is performed while the stored image data is being printed or the requiring operation for setting a recording sheet is being performed.

In step S455, the CPU 1-1 receives a binary signal. In step S456, the CPU 1-1 checks whether the PPS-Q has been received. If the PPS-Q is not received, the CPU 1-1 checks whether an RR is received in step S457.

In a case where the PPS-Q is received in step S456, or where the RR is received in step S457, the CPU 1-1 sends an RNR to the line in step S458, and then returns to the previous flow.

Figure 32:
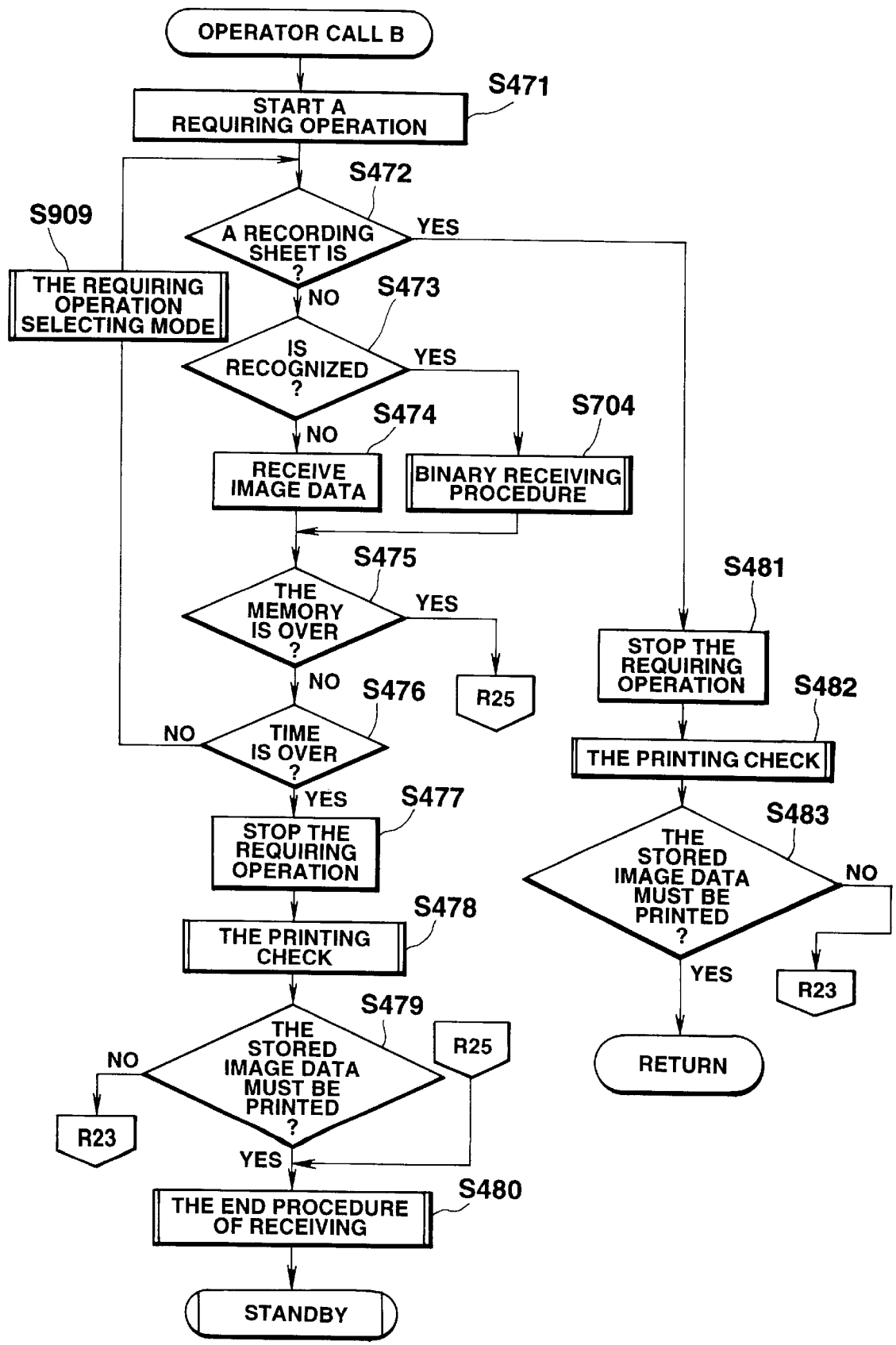
FIG. 32 is a flow chart showing tan operation of an operator call B.

FIG. 32 is a flow chart showing the operation of the operator call B (step S441 of FIG. 29).

In step S471 of FIG. 32, the CPU 1-1 starts the requiring operation for setting a recording sheet, and checks whether a recording sheet is in the recorder 1-6 in step S472. If so, the CPU 1-1 stops the requiring operation in step S481, checks the stored image data to be printed in step S482, and discriminates whether the stored image data must be printed in step S483. If the stored image data must be printed, the CPU 1-1 returns to the previous flow. On the other hand, if the stored image data need not be printed, the CPU 1-1 shifts from step S483 to step S446 (FIG. 30).

In a case where a recording sheet is not in the recorder 1-6 in step S472, the CPU 1-1 discriminates whether the RCP has been received in step S473 If the RCP is not received, the CPU 1-1 performs the image reception in step S472. If the RCP is received, the CPU 1-1 performs the ECM binary receiving procedure in step S704.

In step S475, the CPU 1-1 checks whether the capacity of the image memory, which is available to store image data, is above a predetermined amount. If not, the CPU 1-1 performs the end procedure of receiving in step S480, and then returns to the standby condition. If the capacity of the image memory is above the predetermined amount, the CPU 1-1 checks the time elapsed from starting the requiring operation in step S476. In a case where the time is less than the predetermined time, the CPU 1-1 performs the operation of the requiring operation switching mode (FIG. 42) in step S909, and then returns to step S472. On the other hand, in a case where the time is greater than the predetermined time, the CPU 1-1 stops the requiring operation in step S477, checks the stored image data to be printed in step S478, and discriminates whether the stored image data must be printed in step S479. If the stored image data must be printed, the CPU 1-1 performs the end procedure of receiving in step S480, and then returns to the standby condition. If the stored image data need not be printed, the CPU 1-1 shifts from step S479 to step S446 (FIG. 30).

Figure 33:
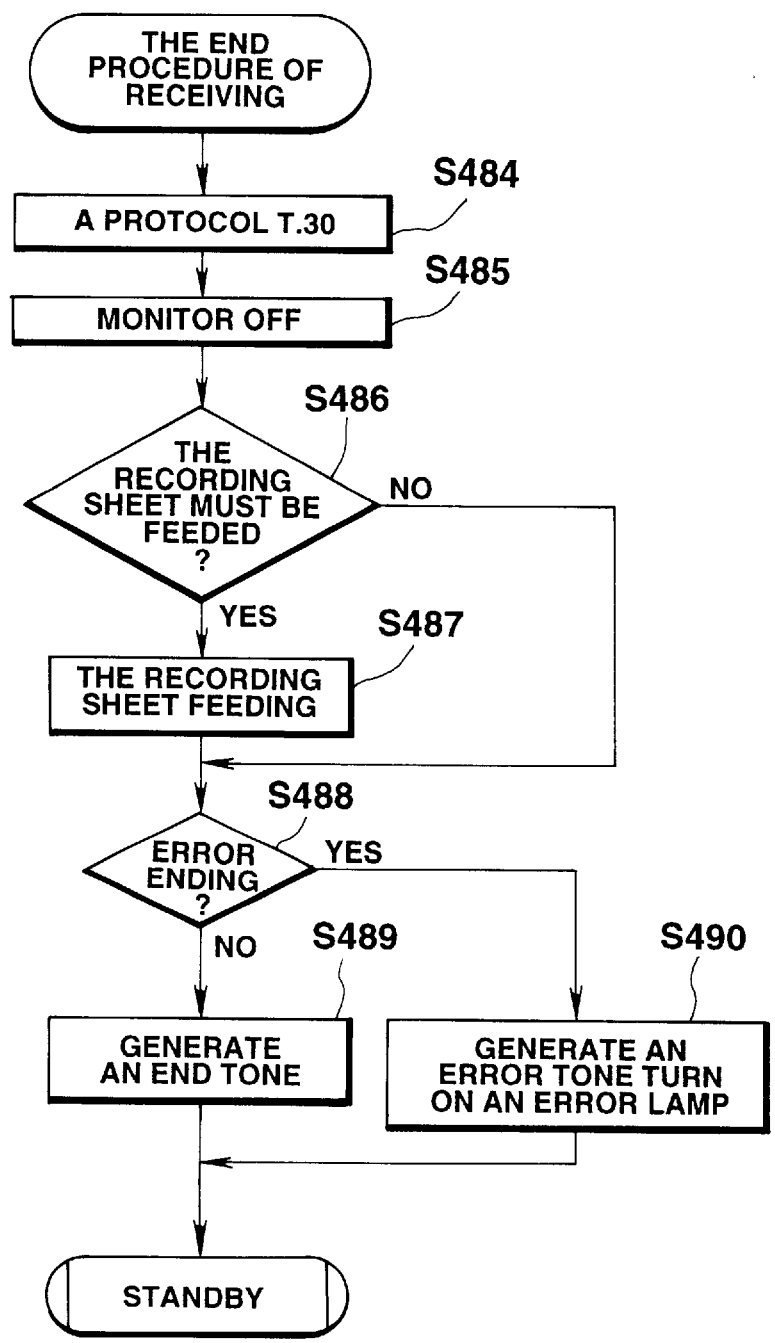
FIG. 33 is a flow chart showing the end procedure of receiving.

FIG. 33 is a flow chart showing the end procedure of receiving (e.g. step S412 of FIG. 25, step S426 of FIG. 27).

In step S484 of FIG. 33, the CPU 1-1 terminates the image reception in accordance with the procedure T.30 which is the CCITT recommendation. The CPU 1-1 then stops the monitor operation of the line in step S485, and discriminates whether the recording sheet feeding operation is performed in step S486. In a case where no recording sheet is in the recorder 1-6, or where no information has been printed on the recording sheet set in the recorder 1-6, etc., the feeding operation is not performed. In a case where some information has been printed on the recording sheet set in the recording 1-6, the CPU 1-1 performs the feeding operation in step S487.

In step S488, the CPU 1-1 discriminates whether the image reception was an error. If so, the CPU 1-1 causes the buzzer 1-14 to generate an error tone and turns on an error lamp of the console unit 1-4 in step S490. If the image reception was not an error, the CPU 1-1 causes the buzzer 1-14 to generate an end tone in step S489, and then returns to the standby condition.

FIG. 34 through FIG. 41 together form a flow chart showing the transmission mode operation (step S30 of FIG. 14).

In step S601 of FIG. 34 the CPU 1-1 initializes the transmission speed at the start time and the flag ECM-MODE, etc. In Step S602, the CPU 1-1 decides whether to operate the monitor operation of the line. The CPU 1-1 then checks whether a timer T1 (to time e.g. 35 seconds), which has started in step S601, has timed out in step S603, and checks whether the DIS has been received in step S604. In a case where the DIS is received before the timer T1 has expired, the CPU 1-1 performs the monitor selecting A (FIG. 23) in step S605. On the other hand, in a case where the timer T1 has expired without the DIS being received, the CPU 1-1 performs an end procedure of transmitting (FIG. 41) in step S611, and then returns to the standby condition.

In step S606, the CPU 1-1 discriminates whether ECM transmission is possible, in accordance with information as to reception of the DIS and information as to ECM communication set in the start key mode (i.e. ON/OFF). If ECM transmission is possible, the CUP 1-1 sets the flag ECM-MODE in step S613. If ECM transmission is not possible, the CPU 1-1 clears the flag ECM-MODE in step S607. Then, in step S608, the CPU 1-1 sends the DCS and a TCF to the line, and checks whether a result of the training is acceptable in step S609. If the result of the training is not adequate, the CPU 1-1 returns to step S606 and sends the DCS and the TCF to the line again. In a case where the result of the training is satisfactory in step S609, the CPU 1-1 performs image transmission (FIG. 39) in step S610, and checks whether the flag ECM-MODE is on in step S614 of FIG. 35. If the flag ECM-MODE is on, the CPU 1-1 shifts from step s614 to step S625 of FIG. 36, and performs a phase D of the ECM transmission. If the flag ECM-MODE is not on, the CPU 1-1 performs a phase D of the normal G3 transmission.

In step S615, the CPU 1-1 checks whether the next document has been set. If the next document has not been set, the CPU 1-1 sends the EOP to the line in step S620, performs the end procedure of transmitting (FIG. 41), and then returns to the standby condition. On the other hand, if the next document has been set, the CPU 1-1 checks whether the transmission mode is changed in step S616. If the transmission mode is changed, the CPU 1-1 sends the EOM to the line in step S623. If the transmission mode is not changed, the CPU 1-1 sends the MPS to the line in step S617. Then, the CPU 1-1 performs the end procedure of transmitting (FIG. 41) in step S618, and checks whether the image transmission is able to be continued in step S619. If the image transmission can not be continued, the CPU 1-1 performs the end procedure of transmitting in step S624, and then returns to the standby condition. Otherwise, the CPU 1-1 shifts from step S619 to step S603, step S606 or step S610 (FIG. 34). When the MPS is sent in step S617, the CPU 1-1 shifts to step S610. When the EOM is sent in step S623, the CPU 1-1 shifts to step S603 or step S606.

Figure 36:
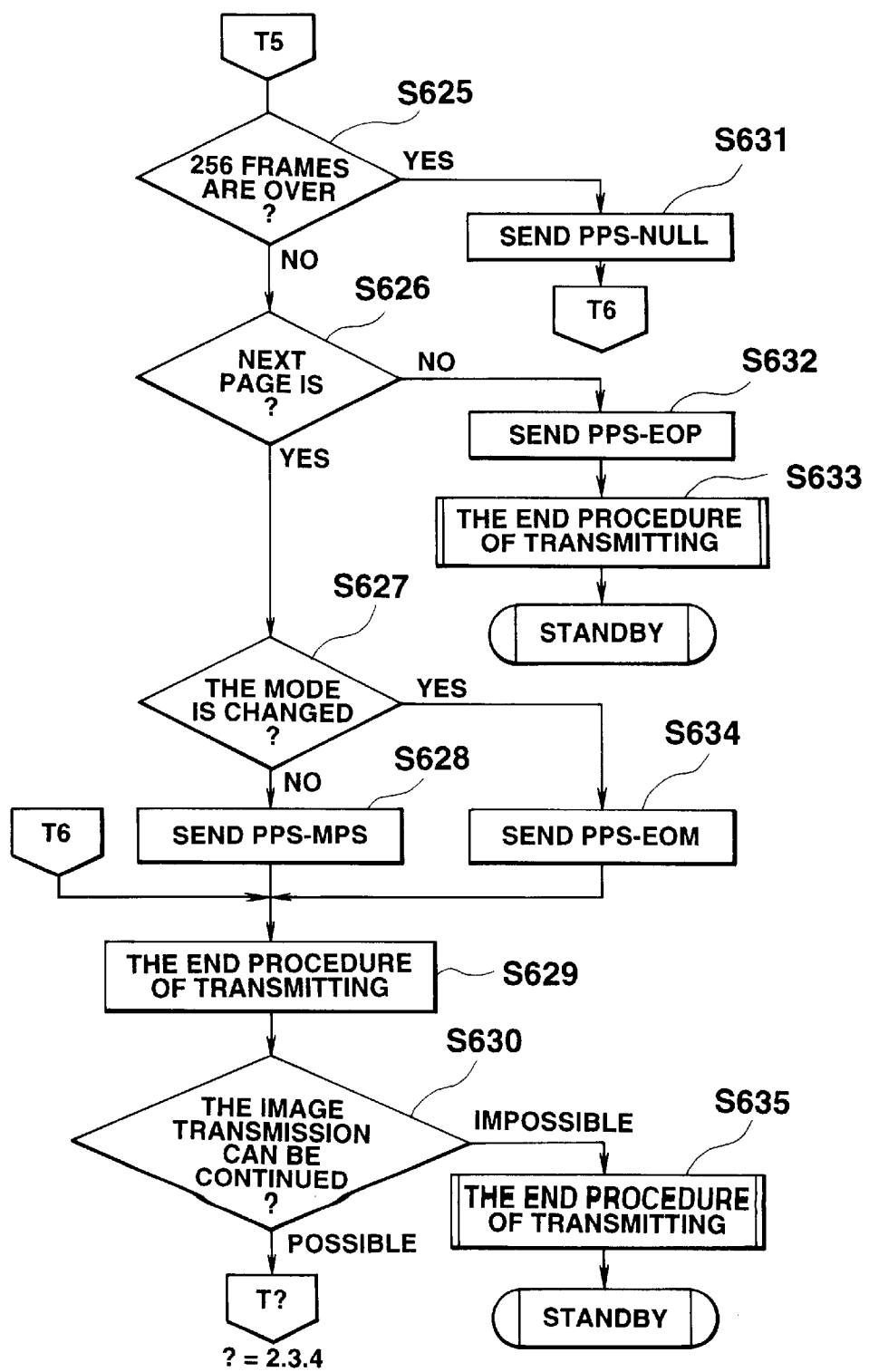

In a case where the flag ECM-MODE is on in step S614, the CPU 1-1 checks whether a page of image data to be transmitted is less than one block (256 flags) in step S625 (FIG. 36). If a page is not less than one block, the CPU 1-1 sends the PPS-NULL to the line in step S631, and then shifts to step S629. If a page of image data is less than one block, the CPU 1-1 checks whether another page of documents is set in the reader 1-5 in responsive to a requiring operation for setting a document after the reading of the previous document has been finished in step S626. If no next page has been set, the CPU 1-1 sends the PPS-EOP to the line in step S632, performs the end procedure of transmitting in step S633, and then returns to the standby condition. If a next page is set in step S626, the CPU 1-1 checks whether the transmission mode is changed in step S627. If the transmission mode is changed, the CPU 1-1 sends the PPS-EOM to the line in step S634. On the other hand, if the transmission mode is not changed, the CPU 1-1 sends the PPS-MPS to the line in step S628.

In step S629, the CPU 1-1 performs a procedure for continuing the image transmission in step S629, and checks whether the image transmission is able to be continued in step S630. If the image transmission is not able to be continued, the CPU 1-1 performs the end procedure of transmitting in step S635, and then returns to the standby condition. If the image transmission is able to be continued, the CPU 1-1 shifts from step S630 to either step S603, step S606, or step S610 (FIG. 34).

Figure 37:
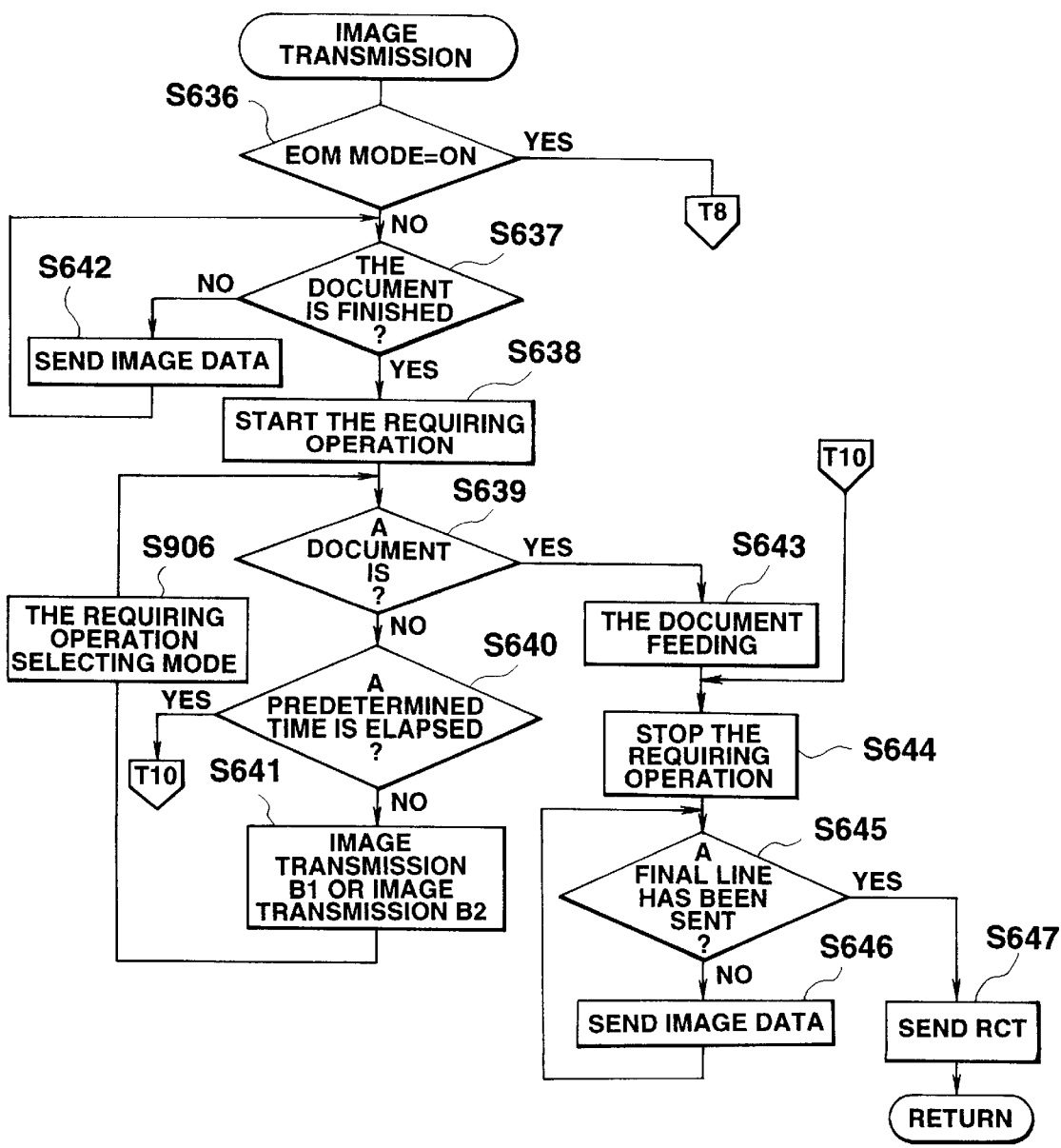
FIG. 37 and FIG. 38 together form a flow chart showing an operation of an image transmission.
Figure 38:
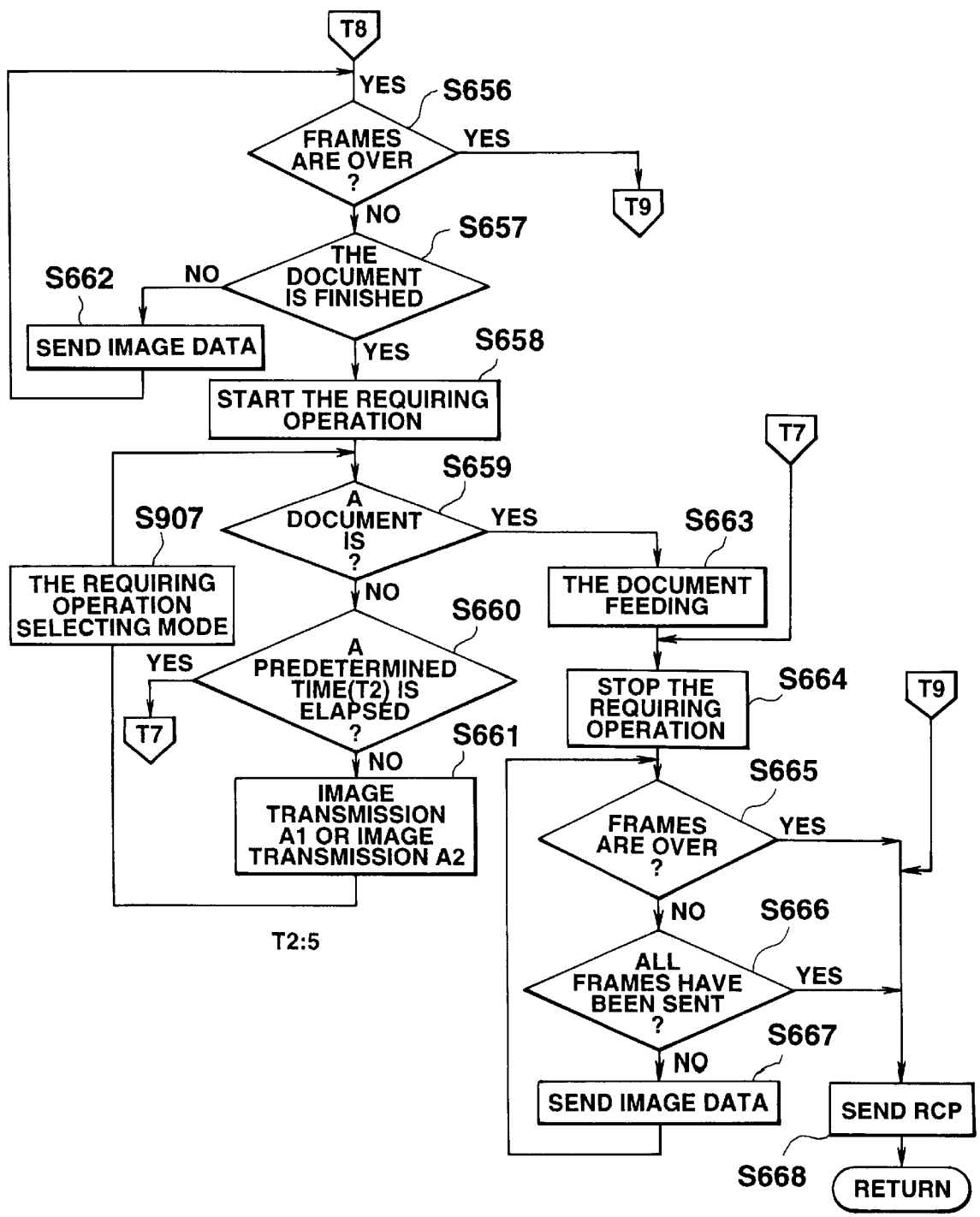

FIG. 37 and FIG. 38 together form a flow chart showing image transmission (step S610 of FIG. 34).

In step S636 of FIG. 37, the CPU 1-1 checks whether the flag ECM-MODE is on. If the flag ECM-MODE is on, the CPU 1-1 shifts from step S636 to step S656 of FIG. 38. If the flag ECM-MODE is not on, the CPU 1-1 checks whether the document is finished in step S637. If the document is not finished, the CPU 1-1 sends image signals to the line in step S642, and then returns to step S637. In a case where the document is finished in step S637, the CPU 1-1 starts a requiring operation (e.g. generating an alarm tone, or displaying an alarm) for setting an additional document in step S638, and checks whether the additional document is set in the reader 1-5 in step S639. If no additional document is set the CPU 1-1 checks the time elapsed from the start the requiring operation for setting a document in step S640. In a case where the time elapsed is less than 5 seconds, the CPU 1-1 performs an image transmission B1 (FIG. 39(a)) or an image transmission B2 (FIG. 39(b)) in step S641, performs the requiring operation switching mode (FIG. 42) in step S906, and then returns to step S639. On the other hand, in a case where the time elapsed is over 5 seconds, the CPU 1-1 shifts from step S640 to step S644. In a case where an additional document is set before the time exceeds 5 seconds, the CPU 1-1 performs the feeding operation of the original document (FIG. 21) in step S643, stops the requiring operation of setting the document in step S644, and checks whether a final line of image data has been sent to the line in step S645. If the final line of image data has not been sent, the CPU 1-1 sends image signals to the line in step S646. If the final line of image data is sent, the CPU 1-1 sends the RTC to the line in step S647, and then returns to the previous flow.

The image transmission B1 and B2 are processes to insert fill data between one line and the next line, or between a final line and the RTC, so as to hold the communication line.

Figure 39A:
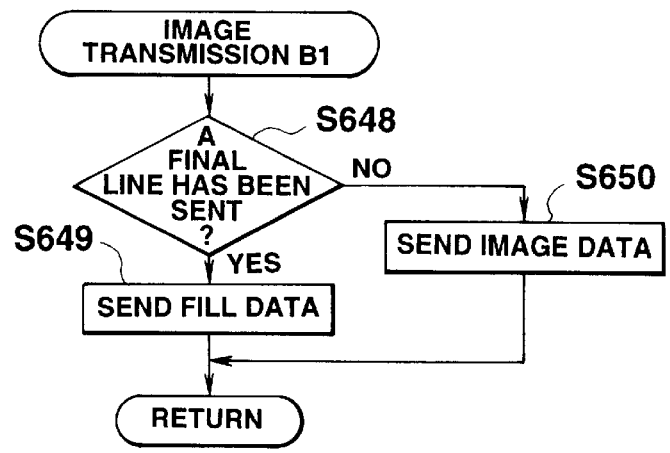
FIG. 39(a) is a flow chart showing an image transmission B1.

In the image transmission B2 (FIG. 39(a)), the CPU 1-1 checks whether the final line of image data has been sent in step S648, and if so, the CPU 1-1 sends fill data to the communication line in step S649. On the other hand, if the final line of image data has not been sent, the CPU 1-1 sends image signals to the communication line in step S650.

Figure 39B:
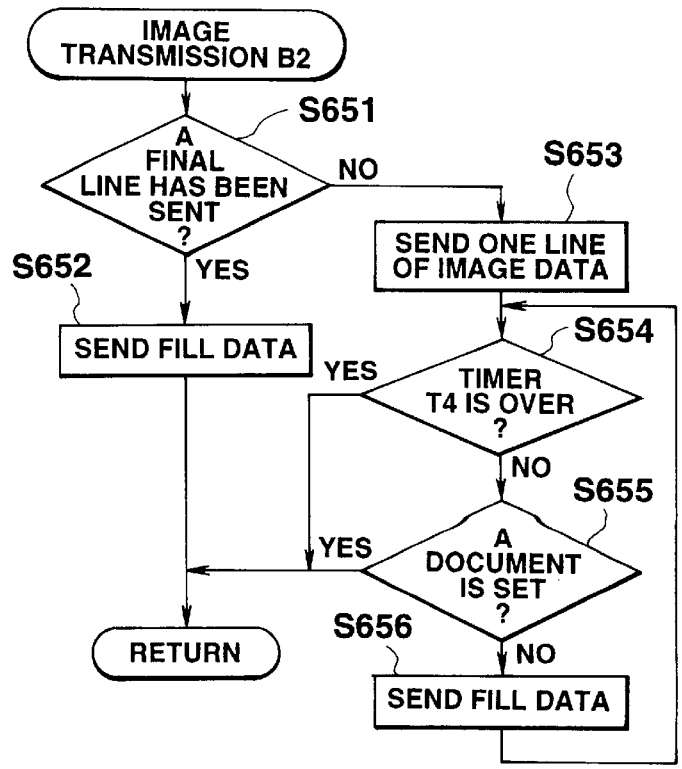
FIG. 39(b) is a flow chart showing an image transmission B2.

In the image transmission B2 (FIG. 39(b)), the CPU 1-1 checks whether the final line of image data has been sent or not in step S651, and if not, the CPU 1-1 sends one line of image data to the communication line and clears a timer T4 in step S653. The CPU 1-1 then checks whether the timer T4 is expired in step S654, and checks whether an additional document is set in the reader 1-5 in step S655. In a case where the timer T4 has expired, or where an additional document is set before the timer T4 has expired, the CPU 1-1 returns to step S906 (FIG. 37). In a case where no additional document is set, the CPU 1-1 sends fill data to the communication line in step S656 until timer T4 has expired. If the final line of image data has been sent in step S651, the CPU 1-1 sends fill data to the communication line in step S652 and then returns to step S906 (FIG. 37).

In a case where the flag ECM-MODE is on in step S638, in step S656 the CPU 1-1 checks whether the sending of one block of data (256 frames) is finished (FIG. 38).

If one block of data is not finished being sent, the CPU 1-1 checks whether the document is finished in step S657. If not, the CPU 1-1 sends image signals to the communication line in step S662. If the document is finished, in step S658, the CPU 1-1 starts the requiring operation of setting a document in step S658, and checks whether a document is set in the reader 1-5 in step S659. If not, the CPU 1-1 checks whether the time elapsed since starting the requiring operation is over a predetermined time (e.g. 5 seconds) in step S660, and if the elapsed time is less than the predetermined time, the CPU 1-1 performs an image transmission A1 (FIG. 40(a)) or an image transmission A2 (FIG. 40(b)) in step S661. The CPU 1-1 then performs the requiring operation switching mode (FIG. 42) in step S907, and returns to step S659. On the other hand, if the elapsed time is greater than the predetermined time in step S660, the CPU 1-1 shifts to step S664.

If a document is set in the reader 1-5 in step S659, the CPU 1-1 performs the document feeding operation (FIG. 21) in step S663, stops the requiring operation for setting a document in step S664, and checks whether sending one block data (256 frames) is finished in step S665. In a case where sending one block data is finished in step S656 or step S665, the CPU 1-1 sends the RCP to the communication line in step S668, and then returns to the previous flow.

If sending one block of data (256 frames) is not finished in step S665, the CPU 1-1 checks whether all frames have been sent in step S666, and if not, the CPU 1-1 sends image signals to the communication line in step S667. If all frames have been sent in step S666, the CPU 1-1 shifts to step S668.

The image transmission A1 and A2 are processes to insert flags between one frame and the next so as to hold the communication line.

Figure 40A:
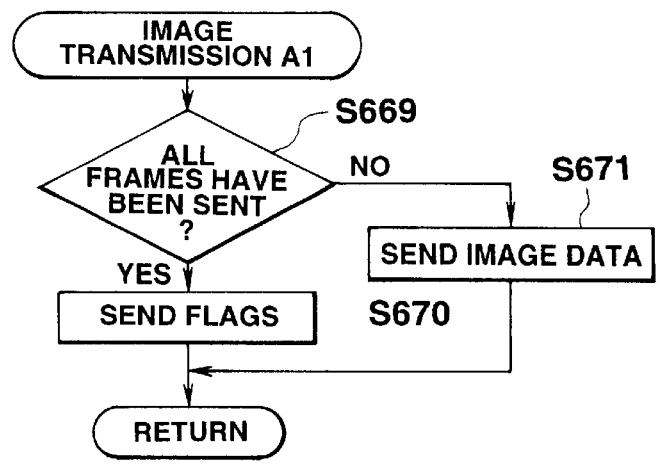
FIG. 40(a) is a flow chart showing an image transmission A1.

In the image transmission A1 (FIG. 40(a)), the CPU 1-1 checks whether all frames have been sent in step S669, and if not, the CPU 1-1 sends image signals to the communication line in step S671. On the other hand, if all frames have been sent, the CPU 1-1 sends flags to the communication line in step S670.

Figure 40B:
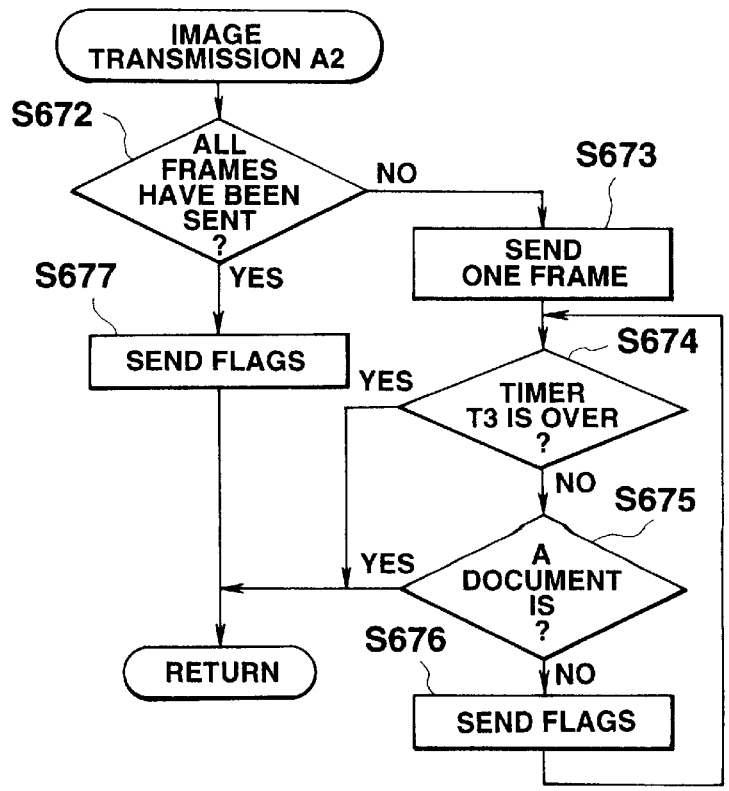
FIG. 40(b) is a flow chart showing an image transmission A2.

In the image transmission A2 (FIG. 40(b)), the CPU 1-1 checks whether all frames have been sent in step S672, and if so, the CPU 1-1 sends flags to the communication line in step S677. If all frames have not been sent, the CPU 1-1 sends one frame of data to the communication line and clears a timer T3 in step S673.

In step S674 the CPU 1-1 checks whether the timer T3 has expired. If so, the CPU 1-1 checks whether a document is set in the reader 1-5 in step S675. In a case where the timer T3 has expired, or where a document is set in the reader 1-5 before the timer T3 has expired, the CPU 1-1 returns to step S907 (FIG. 38). In a case where no document is set, and where the timer T3 has not expired, the CPU 1-1 sends flags to the communication line in step S695.

Figure 35:
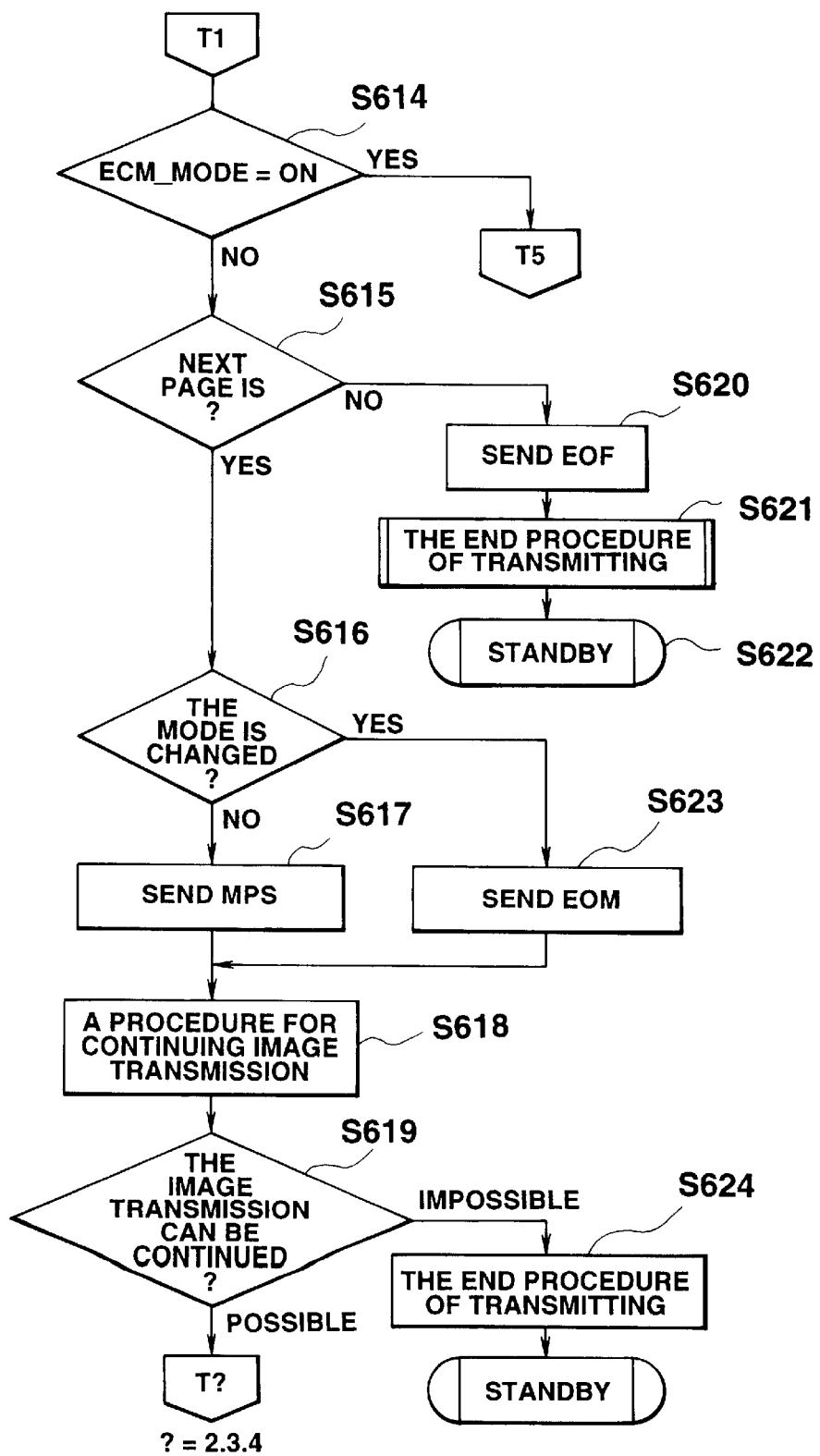
Figure 41:
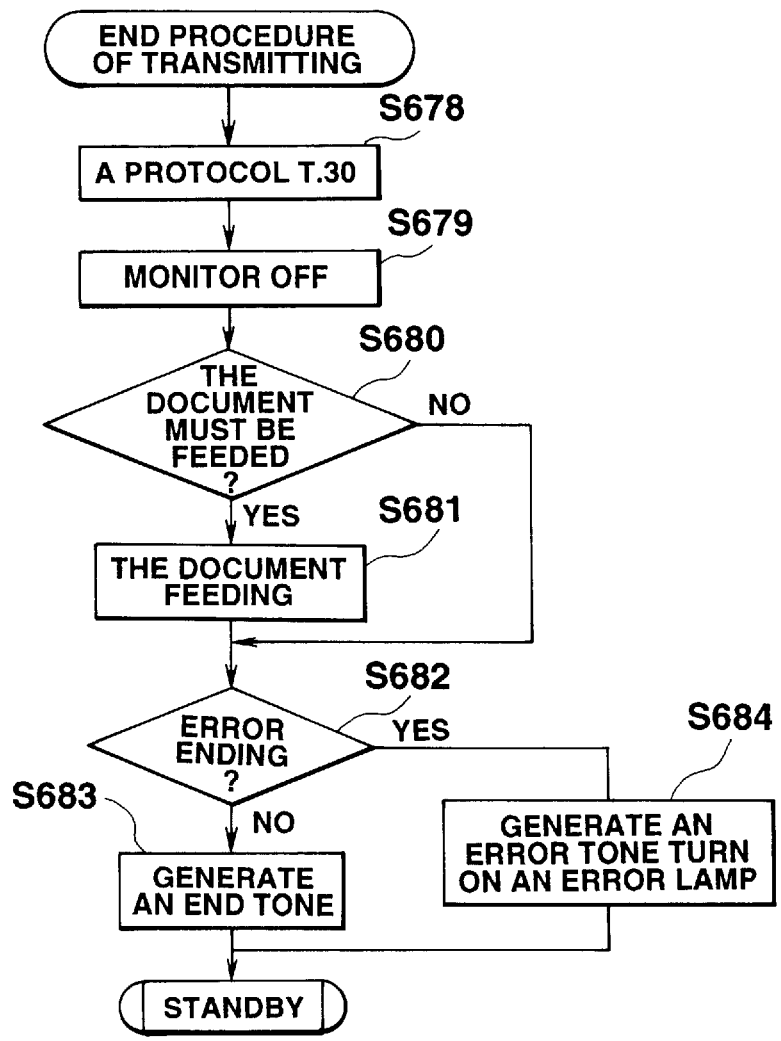
FIG. 41 is a flow chart showing an end procedure of transmitting.

FIG. 41 is a flow chart showing the end procedure of transmitting (step S624 of FIG. 35 and steps S633 and S635 of FIG. 36).

In step S678 of FIG. 41, the CPU 1-1 performs a protocol which is to finish the image transmission and which accords with the recommendation T30 by the CCITT. CPU 1-1 then stops the monitor operation in step S679, and checks if the document must be fed in step S680. If the document must be fed, the CPU 1-1 performs the document feeding operation in step S681.

In step S682, the CPU 1-1 checks whether the image transmission was an error, and if not, the CPU 1-1 causes the buzzer 1-14 to generate an end tone in step S683, and then returns to the standby condition. If the image transmission was an error, the CPU 1-1 causes the buzzer 1-14 to generate an error tone and turns on an error lamp in step S684, and then returns to the standby condition.

Figure 42:
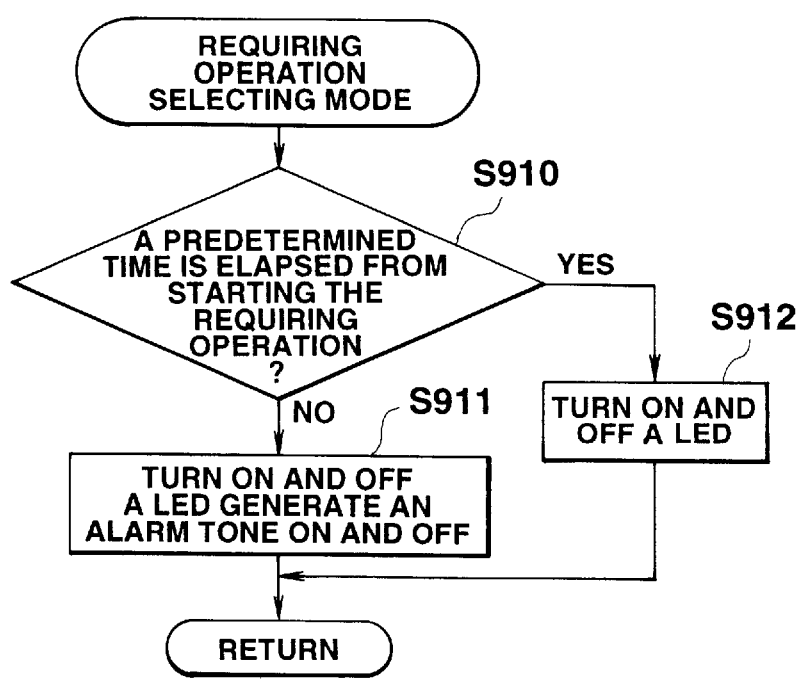
FIG. 42 is a flow chart showing an operation of a requiring operation switching mode.

FIG. 42 is a flow chart showing the requiring operation switching mode (step S906 of FIG. 37, step S907 of FIG. 38, step S908 of FIG. 28, and step S909 of FIG. 32).

In step S910 of FIG. 42, the CPU 1-1 checks the time elapsed from starting the requiring operation of setting a document (or a recording sheet). In a case where the elapsed time is not greater than predetermined time, in step S911 the CPU 1-1 causes the buzzer 1-14 to generate an alarm tome intermittently and turns an LED on and off. If the elapsed time is greater than the predetermined time, the CPU 1-1 turns the LED on and off in step S912 (the CPU 1-1 stops generating the alarm tone), and then returns to the previous flow.

As described above, this facsimile apparatus requires an operator to set a recording sheet or a document in the ECM and G3 communication, and performs a procedure for holding the communication line during the requiring operation of setting a recording sheet or a document. In this fashion, the operator can set a recording sheet or a document without causing an error in the image communication.

Further, this facsimile apparatus changes the requiring operation of setting a recording sheet or a document in accordance with the time elapsed from starting the requiring operation. Consequently, the operator can recognize a condition of the facsimile apparatus appropriately, and this facsimile apparatus can provide a compact and an appropriate operation.

Although a particular embodiment of the present invention is disclosed herein for purposes of explanation, various modifications thereof, after study of this specification, will be apparent to those skilled in the art to which the invention pertains.

What is claimed is:

1. A facsimile apparatus comprising:
    means for recording received image data on a recording material, the recording material being set on said recording means manually;
    means for providing a notification that an additional piece of recording material must be set;
    means for transmitting a procedure signal which indicates that said facsimile apparatus is not ready to receive more data; and
    means for causing said transmitting means to transmit the procedure signal during an operation by said providing means.

2. A facsimile apparatus according to claim 1, wherein said providing means and said causing means stop operating, in response to setting of the additional piece of recording material.

3. A facsimile apparatus according to claim 1, further comprising means for storing the received image data.

4. A facsimile apparatus according to claim 1, wherein said causing means performs a flow control procedure in an ECM reception.

5. A facsimile apparatus according to claim 1, wherein said providing means changes the notification operation in accordance with a time elapsed from the start of the providing operation.

6. A facsimile apparatus according to claim 1, wherein said apparatus is portable.

7. A facsimile apparatus comprising:
    means for reading a document, the document to be read being set on said reading means manually;
    means for storing image data read by said reading means;
    means for transmitting the image data stored by said storage means, through a communication link;
    means for performing a process of holding the communication link;
    means for providing a notification that a subsequent document has not been set when the subsequent document is able to be set before the transmission of the stored image data is finished, and for providing the notification during performing the process of holding the communication link by said performing means; and
    means for detecting that the subsequent document has been set,
    wherein said providing means and said performing means are stopped in response to a detection by said detecting means.

8. A facsimile apparatus according to claim 7, wherein said performing means sends fill data for holding the communication link.

9. A facsimile apparatus according to claim 7, wherein said performing means performs a flow control procedure of a ECM transmission.

10. A facsimile apparatus according to claim 7, wherein said providing means changes the notification operation in accordance with a time elapsed from the start of the providing operation.

11. A facsimile apparatus according to claim 7, wherein said apparatus is portable.

12. An image communication method, for a communication apparatus into which a recording material is manually set, comprising the steps of:
    detecting a recording material during image reception;
    providing a notification that additional recording material is being set in accordance with a detection of the recording material by said detecting step; and
    transmitting a procedure signal which indicates that the communication apparatus is not ready to receive more data during the providing operation.

13. An image communication method according to claim 11, wherein a flow control procedure in an ECM reception is performed in the transmitting step.

14. An image communication method according to claim 12, wherein said providing step changes the notification operation in accordance with a time elapsed from the start of the providing operation.

15. An image communication method according to claim 12, wherein said providing step and said transmitting step are stopped in response to setting of the additional recording material.

16. An image communication method, in a communication apparatus being such as to have a document set thereon manually, comprising the steps of:
   reading image data of a document that has been set on the communication apparatus manually;
   storing the image data read in said reading step;
   transmitting the stored image data;
   performing a process of holding a communication link;
   providing a notification, during said performing step, that a subsequent document has not been set when the subsequent document is able to be set before the transmission of the stored image data is finished; and
   detecting the subsequent document during transmission of the stored image data,
   wherein said providing step and said performing step stop each operation in response to a detection that the subsequent document is set.

17. An image communication method according to claim 16, wherein said performing step sends fill data for holding the communication link.

18. An image communication method according to claim 16, wherein said performing step performs a flow control procedure of a ECM transmission.

19. An image communication method according to claim 16, wherein said providing step changes the notification operation in accordance with a time elapsed from the start of the providing operation.

20. A facsimile apparatus comprising:
   means for receiving image data;
   means for storing the image data received by said reception means;
   means for recording the image data stored by said storage means on a recording material, the recording material being set on said recording means manually;
   means for providing a notification that an additional piece of recording material must be set;
   means for transmitting a procedure signal which indicates that said facsimile apparatus is not ready to receive more data; and
   means for causing said transmitting means to transmit the procedure signal during an operation by said providing means,
   wherein said providing means provides the notification that an additional piece of recording material must be set during a receiving operation of the image data by said reception means.

21. A facsimile apparatus according to claim 20, wherein said providing means and said causing means stop operating, in response to setting of the additional piece of recording material.

22. A facsimile apparatus according to claim 20, wherein said apparatus is portable.

23. A facsimile apparatus according to claim 20, wherein said causing means performs a flow control procedure in an ECM reception.

24. A facsimile apparatus according to claim 20, wherein said providing means changes the notification operation in accordance with a time elapsed from the start of the providing operation.

25. A facsimile apparatus comprising:
   means for recording received image data on a recording material, the recording material being set on said recording means manually;
   means for providing a notification that an additional piece of recording material must be set;
   means for transmitting a procedure signal which indicates that said facsimile apparatus is not ready to receive more data; and
   means for causing said transmitting means to transmit the procedure signal during an operation by said providing means,
   wherein said causing means performs a flow control procedure in an ECM reception.

26. A facsimile apparatus according to claim 25, wherein said providing means and said causing means stop operating, in response to setting of the additional piece of recording material.

27. A facsimile apparatus according to claim 25, further comprising means for storing the received image data.

28. A facsimile apparatus according to claim 25, wherein said providing means changes the notification operation in accordance with a time elapsed from the start of the providing operation.

29. A facsimile apparatus according to claim 25, wherein said apparatus is portable.

30. A facsimile apparatus comprising:
   means for reading a document, the document to be read being set on said reading means manually;
   means for storing the image data read by said reading means;
   means for transmitting the stored image data through a communication link;
   means for performing a process of holding the communication link;
   means for providing a notification that a subsequent document has not been set when the subsequent document is able to be set before the transmission of the stored image data is finished, and for providing the notification during performing the process of holding the communication link by said performing means,
   wherein said providing means provides the notification that an additional document must be set during a transmitting operation of the stored image data, and said performing means performs a process of holding the communication link after transmission of the stored image data has been performed.

31. A facsimile apparatus according to claim 30, wherein said performing means performs a flow control procedure of a ECM transmission.

32. A facsimile apparatus according to claim 30, wherein said providing means changes the notification operation in accordance with a time elapsed from the start of the providing operation.

33. A facsimile apparatus according to claim 30, wherein said providing means and said performing means are stopped in response to setting of the additional document.

34. A facsimile apparatus according to claim 30, wherein said performing means sends fill data for holding the communication link.

35. A facsimile apparatus according to claim 30, wherein said apparatus is portable.

36. A facsimile apparatus comprising:
   means for reading a document, the document to be read being set on said reading means manually;
   means for storing the image data read by said reading means;
   means for transmitting the image data stored by said storage means, through a communication link;
   means for performing a process of holding the communication link; and
   means for providing a notification that a subsequent document has not been set when the subsequent document is able to be set before the transmission of the stored image data is finished, and for providing the notification during performing the process of holding the communication link by said performing means,
   wherein said performing means performs a flow control procedure of an ECM transmission.

37. A facsimile apparatus according to claim 36, wherein said performing means sends fill data for holding the communication link.

38. A facsimile apparatus according to claim 36, wherein said providing means changes the notification operation in accordance with a time elapsed from the start of the providing operation.

39. A facsimile apparatus according to claim 36, wherein said providing means and said performing means are stopped in response to setting of the additional document.

40. A facsimile apparatus according to claim 36, wherein said apparatus is portable.

41. An image communication method, for a communication apparatus into which a recording material is manually set, comprising the steps of:
   receiving image data;
   storing the image data received in the receiving step;
   recording the image data stored in the storing step on the recording material which is manually set;
   providing a notification that an additional piece of recording material must be set; and
   transmitting a procedure signal which indicates that the communication apparatus is not ready to receive more data during an operation in the providing step,
   wherein a notification that an additional piece of recording material must be set during a receiving operation of the image data in the receiving step is provided in the providing step.

42. An image communication method according to claim 41, wherein the providing step and the transmitting step stop operating, in response to setting of the additional piece of recording material.

43. An image communication method according to claim 41, wherein a flow control procedure in an ECM reception is performed in the transmitting step.

44. An image communication method according to claim 41, wherein the providing step changes the notification operation in accordance with a time elapsed from the start of the providing operation.

45. An image communication method, for a communication apparatus into which a recording material is manually set, comprising the steps of:
   recording received image data on the recording material which is manually set;
   providing a notification that an additional piece of recording material must be set; and
   transmitting a procedure signal which indicates that the communication apparatus is not ready to receive more data during an operation in the providing step,
   wherein a flow control procedure in an ECM reception is performed in the transmitting step.

46. An image communication method according to claim 45, wherein the providing step and the transmitting step stop operating, in response to setting of the additional piece of recording material.

47. An image communication method according to claim 45, further comprising a storing step for storing the received image data.

48. An image communication method according to claim 45, wherein the providing step changes the notification operation in accordance with a time elapsed from the start of the providing operation.

49. An image communication method, in a communication apparatus being such as to have a document set thereon manually, comprising the steps of:
   reading image data of a document which has been set on the communication apparatus manually;
   storing the image data read in the reading step;
   transmitting the stored image data through a communication link;
   performing a process of holding the communication link; and
   providing a notification, during the performing step, that a subsequent document has not been set when the subsequent document is able to be set before the transmission of the stored image data is finished,
   wherein a notification that an additional document must be set during a transmitting operation of the stored image data is provided in the providing step, and a process of holding the communication link after transmission of the stored image data is performed in the performing step.

50. An image communication method according to claim 49, wherein the providing step changes the notification operation in accordance with a time elapsed from the start of the providing operation.

51. An image communication method according to claim 49, wherein the providing step and the performing step are stopped in response to setting of the additional document.

52. An image communication method according to claim 49, wherein the performing step sends fill data for holding the communication link.

53. An image communication method according to claim 49, wherein the performing step performs a flow control procedure of a ECM transmission.

54. An image communication method, in a communication apparatus being such as to have a document set thereon manually, comprising the steps of:
   reading image data of a document that has been set on the communication apparatus manually;
   storing the image data read in said reading step;
   transmitting the image data, stored in the storing step, through a communication link;
   performing a process of holding the communication link; and
   providing a notification, during the performing step, that document has not been set when the subsequent document is able to be set before the transmission of the stored image data is finished,
   wherein a flow control procedure of an ECM transmission is performed in the performing step.

55. An image communication method according to claim 54, wherein the providing step and the performing step are stopped in response to setting of the additional document.

56. An image communication method according to claim 54, wherein the performing step sends fill data for holding the communication link.

57. An image communication method according to claim 54, wherein the providing step changes the notification operation in accordance with a time elapsed from the start of the providing operation.

58. A facsimile apparatus comprising:
- a recorder for recording received image data on a recording material, the recording material being set on said recorder manually;
- a notifying device for notifying an operator of said facsimile apparatus that an additional piece of recording material must be set; and
- a transmitting circuit for transmitting a procedure signal which indicates that said facsimile apparatus is not ready to receive more data during an operation by said notifying device.

59. A facsimile apparatus according to claim 58, wherein said notifying device and said communication circuit stop operating in response to the setting of the additional piece of recording material.

60. A facsimile apparatus according to claim 58, further comprising memory in which the received image data is stored.

61. A facsimile apparatus according to claim 58, wherein said communication circuit performs a flow control procedure in an ECM reception.

62. A facsimile apparatus according to claim 58, wherein said notifying device changes the notification operation in accordance with a time elapsed from the start of the notification operation.

63. A facsimile apparatus comprising:
- a reader for reading a document, said reader having the document set thereon manually;
- a memory in which image data read by said reader is stored;
- a transmitter for transmitting through a communication link the image data stored in said memory;
- a communication circuit for holding the communication link;
- a notifying device for warning an operator of said facsimile apparatus that a subsequent document has not been set when the subsequent document is able to be set before the transmission of the stored image data is finished, and for providing the warning during performing the process of holding the communication link by said communication circuit; and
- a detector for detecting that the subsequent document has been set,
- wherein said notifying device and said communication circuit are stopped in response to a detection by said detector.

64. A facsimile apparatus according to claim 63, wherein said communication circuit sends fill data for holding the communication link.

65. A facsimile apparatus according to claim 63, wherein said communication circuit performs a flow control procedure of an ECM transmission.

66. A facsimile apparatus according to claim 63, wherein said notifying device changes the notification operation in accordance with a time elapsed from the start of the providing operation.

* * * * *

UNITED STATES PATENT AND TRADEMARK OFFICE
CERTIFICATE OF CORRECTION

PATENT NO. : 5,886,795

DATED : March 23, 1999

INVENTOR(S) : TAKESHI TSUKAMOTO, ET AL.

It is certified that error appears in the above-identified patent and that said Letters Patent is hereby corrected as shown below:

AT [56] REFERENCES CITED

FOREIGN PATENT DOCUMENTS

"4235452" should read --4-235452--; and
"4301940" should read --4-301940--.

AT [56] REFERENCES CITED

Attorney, Agent or Firm—"Fitzpatrick Cella Harper & Scinto" should read --Fitzpatrick, Cella, Harper & Scinto--.

IN THE DRAWINGS

Sheet 11, FIG. 12, "A ECONOMY" should read --AN ECONOMY--;
Sheet 16, FIG. 17, "MODES" (both occurrences) should read --MODE--; and
Sheet 33, FIG. 34, "TRAINNING" (both occurrences) should read --TRAINING--.

UNITED STATES PATENT AND TRADEMARK OFFICE
CERTIFICATE OF CORRECTION

PATENT NO. : 5,886,795

DATED : March 23, 1999

INVENTOR(S) : TAKESHI TSUKAMOTO, ET AL.

It is certified that error appears in the above-identified patent and that said Letters Patent is hereby corrected as shown below:

COLUMN 2

Line 50, "tan" should read --an--.

COLUMN 9

Line 40, "is" should read --in--.

COLUMN 11

Line 21, ""1"" should read --"0"--.

COLUMN 12

Line 10, "FIG. 25" should read --FIG. 25,--.

COLUMN 14

Line 4, "S465," should read --S465.--;
    Line 6, "condition" should read --condition.--;
    Line 23, "S443," should read --S443.--; and
    Line 42, "had," should read --hand,--.

UNITED STATES PATENT AND TRADEMARK OFFICE
CERTIFICATE OF CORRECTION

PATENT NO. : 5,886,795

DATED : March 23, 1999

INVENTOR(S) : TAKESHI TSUKAMOTO, ET AL.

It is certified that error appears in the above-identified patent and that said Letters Patent is hereby corrected as shown below:

COLUMN 15

Line 39, "S473" should read --S473.--.

COLUMN 16

Line 50, "s614" should read --S614--.

COLUMN 17

Line 13, "responsive" should read --response--; and
    Line 49, "start" should read --start of--.

COLUMN 19

Line 37, "tome" should read --tone--.

UNITED STATES PATENT AND TRADEMARK OFFICE
CERTIFICATE OF CORRECTION

PATENT NO. : 5,886,795

DATED : March 23, 1999

INVENTOR(S) : TAKESHI TSUKAMOTO, ET AL.

It is certified that error appears in the above-identified patent and that said Letters Patent is hereby corrected as shown below:

<u>COLUMN 20</u>

```
Line 66, "11," should read --12,--.
```

Signed and Sealed this

Eighteenth Day of April, 2000

*Attest:*

Q. TODD DICKINSON

*Attesting Officer*      *Director of Patents and Trademarks*